US010909225B2

(12) United States Patent
Kumar Agrawal et al.

(10) Patent No.: US 10,909,225 B2
(45) Date of Patent: Feb. 2, 2021

(54) ELECTRONIC DEVICES AND CORRESPONDING METHODS FOR PRECLUDING ENTRY OF AUTHENTICATION CODES IN MULTI-PERSON ENVIRONMENTS

(71) Applicant: Motorola Mobility LLC, Chicago, IL (US)

(72) Inventors: Amit Kumar Agrawal, Bangalore (IN); Srikanth Raju, Bangalore (IN); Renuka Prasad Herur Rajashekaraiah, Bangalore (IN); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 83 days.

(21) Appl. No.: 16/133,257

(22) Filed: Sep. 17, 2018

(65) Prior Publication Data

US 2020/0089851 A1 Mar. 19, 2020

(51) Int. Cl.
*G06F 21/32* (2013.01)
*H04W 4/029* (2018.01)
(Continued)

(52) U.S. Cl.
CPC .............. *G06F 21/32* (2013.01); *G06F 21/45* (2013.01); *G06K 9/00221* (2013.01);
(Continued)

(58) Field of Classification Search
CPC .......... G06F 21/32; G06F 21/45; G06F 21/31; G06F 21/84; H04W 4/029; H04W 12/08;
(Continued)

(56) References Cited

U.S. PATENT DOCUMENTS 6,836,556 B1 * 12/2004 Bromba .................... G06K 9/32
382/124
8,423,785 B2 * 4/2013 Takikawa ........... G06K 9/00221
713/186
(Continued)

FOREIGN PATENT DOCUMENTS

EP 2981063 2/2016
EP 3624036 3/2020

OTHER PUBLICATIONS

Edwards, Carolyn R., "Non-Final OA", US. Appl. No. 14/721,647, filed May 26, 2015; dated Sep. 30, 2016.
(Continued)

*Primary Examiner* — Aravind K Moorthy
(74) *Attorney, Agent, or Firm* — Philip H. Burrus, IV

(57) ABSTRACT

An electronic device includes a user interface. The user interface can include a display. One or more sensors, which may include an imager, can be included as well. One or more processors are operable with the user interface and the one or more sensors. The one or more processors determine, from signals from the one or more sensors, whether one or more persons are within a predefined environment of the electronic device. Where only one person is within the predefined environment, the one or more processors request entry of a user authentication code at the user interface to authenticate the one person as an authorized user of the electronic device. However, where two or more persons are within the predefined environment, the one or more processors preclude entry of the user authentication code at the user interface. This prevents nefarious actors from seeing entry of the user authentication code.

20 Claims, 7 Drawing Sheets

(51) Int. Cl.
*G06F 21/45* (2013.01)
*G06K 9/00* (2006.01)
*H04L 9/32* (2006.01)
*H04W 12/08* (2009.01)

(52) U.S. Cl.
CPC ........ *G06K 9/00771* (2013.01); *H04L 9/3226* (2013.01); *H04W 4/029* (2018.02); *H04W 12/08* (2013.01)

(58) Field of Classification Search
CPC ........... G06K 9/00221; G06K 9/00771; G06Q 10/10; H04L 9/3226
See application file for complete search history.

(56) References Cited

U.S. PATENT DOCUMENTS

| | | | | |
|---|---|---|---|---|
| 8,812,344 | B1* | 8/2014 | Saurabh | G06K 9/00778 705/7.29 |
| 9,842,224 | B2 | 12/2017 | Alameh et al. | |
| 9,881,058 | B1* | 1/2018 | Liu | G06F 16/24578 |
| 10,268,878 | B2* | 4/2019 | Benini | G06K 9/00288 |
| 2004/0147254 | A1* | 7/2004 | Reddy | H04W 88/04 455/422.1 |
| 2006/0267780 | A1* | 11/2006 | Adams | G08B 21/0423 340/573.1 |
| 2007/0009139 | A1 | 1/2007 | Landschaft et al. | |
| 2010/0167753 | A1* | 7/2010 | Das | H04L 63/107 455/456.1 |
| 2011/0248152 | A1 | 10/2011 | Svajda et al. | |
| 2013/0007857 | A1* | 1/2013 | Li | H04L 63/0428 726/6 |
| 2013/0057573 | A1 | 3/2013 | Chakravarthula et al. | |
| 2013/0222271 | A1 | 8/2013 | Alberth | |
| 2014/0009568 | A1* | 1/2014 | Stec | G06T 5/006 348/36 |
| 2014/0015930 | A1* | 1/2014 | Sengupta | G06F 21/32 348/46 |
| 2014/0029810 | A1 | 1/2014 | Barr et al. | |
| 2014/0161305 | A1* | 6/2014 | Lee | G06F 3/0304 382/103 |
| 2014/0285352 | A1 | 9/2014 | Cho et al. | |
| 2014/0340466 | A1* | 11/2014 | Fox | H04N 7/15 348/14.08 |
| 2015/0003691 | A1 | 1/2015 | Joo | |
| 2015/0046825 | A1 | 2/2015 | Li | |
| 2015/0055085 | A1* | 2/2015 | Fonte | G06F 30/00 351/178 |
| 2015/0067785 | A1* | 3/2015 | Donnellan | H04W 12/06 726/4 |
| 2015/0161063 | A1 | 6/2015 | Cudak | |
| 2015/0161434 | A1 | 6/2015 | Ross | |
| 2015/0221151 | A1* | 8/2015 | Bacco | G06K 9/00288 340/5.83 |
| 2015/0281279 | A1* | 10/2015 | Smith | H04L 9/3247 726/1 |
| 2015/0286804 | A1* | 10/2015 | Major | G06F 21/32 726/16 |
| 2015/0332032 | A1 | 11/2015 | Alameh et al. | |
| 2015/0347732 | A1 | 12/2015 | Alameh et al. | |
| 2015/0365794 | A1* | 12/2015 | Hardwick | A61K 31/519 455/457 |
| 2016/0062345 | A1* | 3/2016 | Stubbs | G05D 1/0214 701/2 |
| 2016/0174072 | A1* | 6/2016 | Allyn | H04W 12/06 455/411 |
| 2016/0210473 | A1* | 7/2016 | Cohen | G06K 9/00255 |
| 2016/0283789 | A1* | 9/2016 | Slaby | G06K 9/22 |
| 2016/0345264 | A1* | 11/2016 | Alameh | H04W 52/0254 |
| 2016/0349792 | A1 | 12/2016 | Alameh et al. | |
| 2017/0006417 | A1* | 1/2017 | Canoy | H04W 12/10 |
| 2017/0006449 | A1* | 1/2017 | Igumnov | H04W 4/024 |
| 2017/0041963 | A1* | 2/2017 | Edge | H04W 12/08 |
| 2017/0236348 | A1* | 8/2017 | Hosey | G06T 19/006 345/633 |
| 2017/0255786 | A1* | 9/2017 | Krishnamurthi | G06F 3/167 |
| 2017/0286715 | A1* | 10/2017 | Kaladgi | G06F 21/6245 |
| 2017/0317993 | A1 | 11/2017 | Weber | |
| 2017/0344255 | A1* | 11/2017 | Xie | G06F 1/1626 |
| 2017/0352250 | A1* | 12/2017 | de Barros Chapiewski | H04L 67/26 |
| 2018/0102932 | A1* | 4/2018 | Vanchev | H04M 1/7258 |
| 2018/0260876 | A1* | 9/2018 | Graham | G06K 9/209 |
| 2018/0285550 | A1* | 10/2018 | Zhu | G06F 21/36 |
| 2018/0352376 | A1* | 12/2018 | Shuman | H04W 4/40 |
| 2019/0073520 | A1* | 3/2019 | Ayyar | G06K 9/00677 |
| 2019/0089831 | A1* | 3/2019 | Medlen | H04M 3/4936 |
| 2019/0147676 | A1* | 5/2019 | Madzhunkov | G06K 9/00214 340/5.2 |
| 2019/0238719 | A1* | 8/2019 | Alameh | G06K 9/00288 |
| 2019/0377898 | A1* | 12/2019 | Dunjic | H04R 1/406 |
| 2019/0378519 | A1* | 12/2019 | Dunjic | G10L 17/00 |
| 2020/0026830 | A1* | 1/2020 | Alameh | G06K 9/00892 |
| 2020/0089252 | A1* | 3/2020 | Kim | G05D 1/0274 |
| 2020/0089851 | A1* | 3/2020 | Kumar Agrawal | H04W 4/029 |
| 2020/0105254 | A1* | 4/2020 | Sarir | H04W 4/20 |
| 2020/0145787 | A1* | 5/2020 | Roy Choudhury | H04W 64/003 |
| 2020/0193200 | A1* | 6/2020 | Bosma | G06K 9/00288 |

OTHER PUBLICATIONS

Edwards, Carolyn R., "Final OA", U.S. Appl. No. 14/721,647, filed May 26, 2015; dated May 4, 2017.
"EPC Rule 69 Communication", EP Application No. 19197852.7; dated Mar. 23, 2020; Reference MM920180006-EP.
"Google Support—See devices that have used your account", Google Support; Unknown Publication date; Viewed online Dec. 4, 2020; Available at https://support.google.com/accounts/answer/3067630?hl=en.
"Google Support—View Devices Signed into Your Account", Unknown publication date but prior to filing of present application; Viewed online at https://myaccount.google.com/device-activity?pli=1,.
Nield, David, "See What Devices Are Signed Into Your Google Account with this Dashboard", Published Feb. 13, 2015; Viewed Online; Available at https://gizmodo.com/see-what-devices-are-signed-into-your-google-account-wi-1669229199.

* cited by examiner

ELECTRONIC DEVICES AND CORRESPONDING METHODS FOR PRECLUDING ENTRY OF AUTHENTICATION CODES IN MULTI-PERSON ENVIRONMENTS

BACKGROUND

Technical Field

This disclosure relates generally to electronic devices, and more particularly to electronic devices with user authentication systems.

Background Art

Modern electronic devices, such as smartphones, allow a user to hold the computing power of yesterday's supercomputer in their palm. This computing power allows the user to not only make voice telephone calls, but to perform numerous other operations as well. Users can send text messages, multimedia messages, execute financial transactions, watch movies and television shows, listen to music, store and analyze medical information, store large photo galleries, maintain calendars, to-do, and contact lists, and even perform personal assistant functions.

Many of these functions require the entry, storage, and retrieval of "private" data about the user. Such data can include their location, financial information, medical information, personal identifiers such as Social Security Numbers, and activity history, e.g., travels, purchases, contacts, and so forth. With all of this information stored in an electronic device, it can be desirable to ensure that only an authorized user or device owner be able to see or share this data. At the same time, it is also desirable to have a simple and efficient user interface that allows for quick access to the electronic device. It would be advantageous to have an improved user interface that works to protect the exposure of private data.

Figure 1:
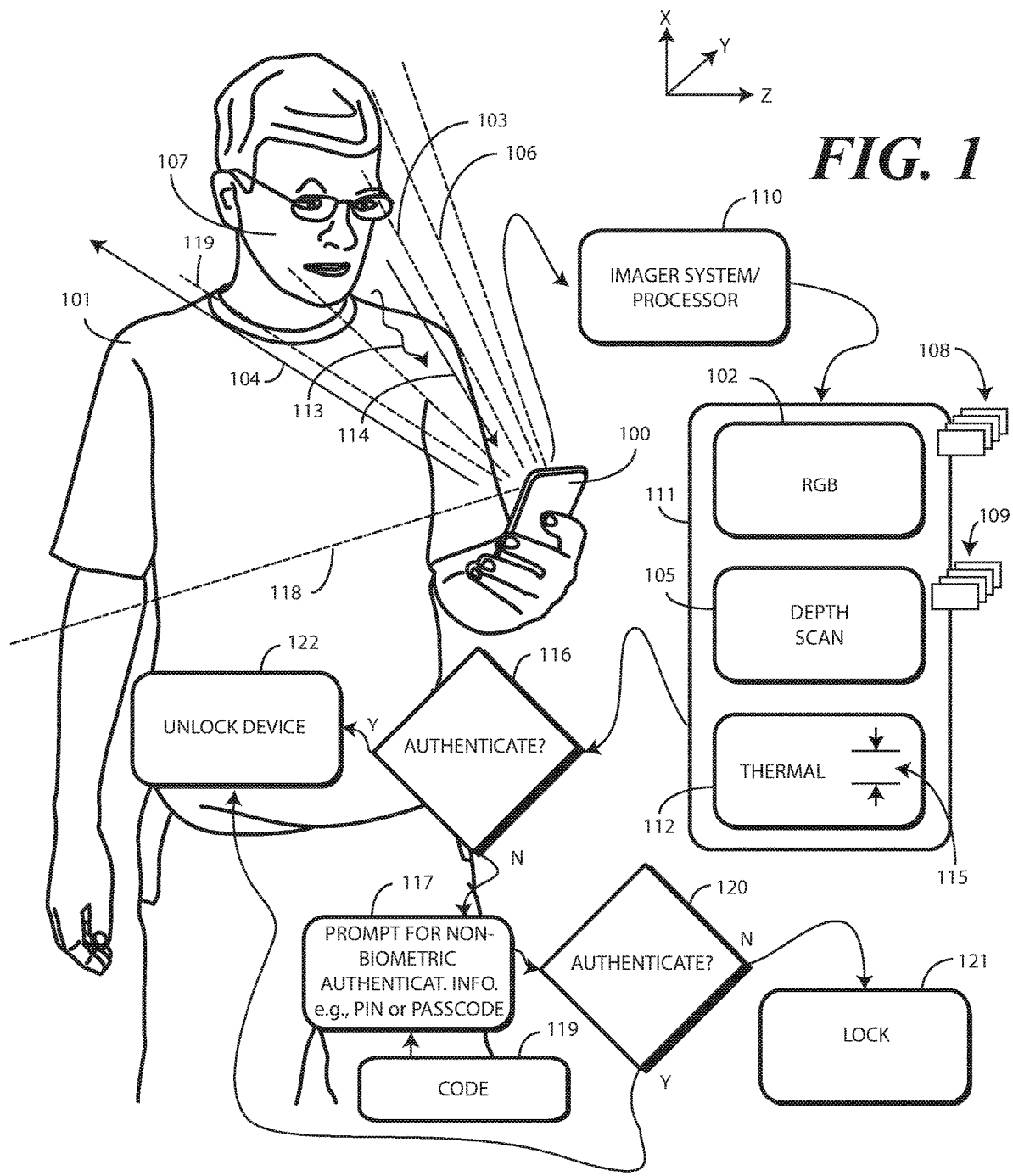
FIG. 1 illustrates one or more explanatory system components and method steps in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to precluding entry of user authentication data, such as a Personal Identification Number (PIN), password, or other user authentication code when persons other than an authorized user and/or device owner are within an environment of the electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of precluding the entry of user authentication data or user authentication codes when persons other than an authorized user or device owner are within an environment of the electronic device as described herein. The non-processor circuits may include, but are not limited to, a radio receiver, a radio transmitter, signal drivers, clock circuits, power source circuits, and user input devices. As such, these functions may be interpreted as steps of a method to perform the preclusion of the entry of user authentication data or codes when two or more persons are within an environment of the electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Most all portable electronic devices, including smartphones, tablet computers, gaming devices, laptop computers, multimedia players, and the like, now come with an option to prevent unauthorized access to the device. Illustrating by example, most smartphones allow the user to elect the requirement that a PIN or password be entered to access or "unlock" the electronic device. Many devices now come with other modes of obtaining access as well, including the use of fingerprint sensors, facial recognition devices, or other biometric sensors.

Embodiments of the disclosure contemplate that, at times, a biometric sensor may be unsuccessful in authenticating a person as an authorized user of an electronic device. For instance, if a smartphone has a facial recognition device, and a person who is an authorized user happens to be out in the cold with a ski mask over their face, the facial recognition device will likely be unable to authenticate the person as an authorized user. Similarly, if a person is lying in bed with their face half covered by a pillow or blanket, the facial recognition device likely will be unable to authenticate the person as an authorized user.

Embodiments of the disclosure contemplate that when this occurs, an electronic device may employ a backup method of authentication. For example, where a biometric sensor fails to authenticate a person as an authorized user of the electronic device, one or more processors may present a prompt on the display requesting that a user authentication code, such as a PIN or password, be entered for user authentication purposes. If the user enters the proper user authentication code, they will be authorized. By contrast, if the proper user authentication code is not entered, the device will remain locked.

The problem with these prior art systems is that an unauthorized user, which could be a friend, stranger, nosy coworker, or other person, may have the display within their line of sight. When this occurs, they may be able to watch the authorized user enter the authentication code. If the authentication code is a simple one, e.g., a four-digit number, the other person may remember the code. When the authorized user is away from the electronic device, this unscrupulous person may attempt to access the electronic device using the stolen authentication code, thereby gaining access to the authorized user's private information stored within the electronic device.

Advantageously, embodiments of the disclosure prevent this from happening. In one or more embodiments, one or more processors of an electronic device determine, with one or more sensors, whether one or more persons are within a predefined environment of the electronic device. Where only one person is within the predefined environment, the one or more processors can request entry of a user authentication code at the user interface to authenticate that person as an authorized user of the electronic device. By contrast, where two or more persons are within the predefined environment, the one or more processors can instead preclude entry of the user authentication code at the user interface to authenticate a person as the authorized user of the electronic device. This preclusion step prevents an unauthorized user from spying on the display in an effort to see what the authorized user's authentication code is during entry of the same.

In one or more embodiments, a user can override this preclusion. Such an override may be warranted, for example, where the other person is the spouse of the authorized user. Alternatively, an authorized user may override the preclusion when the other person is a trusted friend, and so forth.

In one or more embodiments, the one or more processors of the electronic device may present indicia, such as one or more prompts, when the preclusion occurs. Illustrating by example, in one or more embodiments, the one or more processors may present a prompt on the display when two or more persons are within the predefined environment about the electronic device requesting the electronic device be moved to a location where the only one person is within the predefined environment. Such a prompt may say, "Multiple persons have been detected, which may compromise security. Please move to a private location for user authentication entry to be enabled." Other prompts will be obvious to those of ordinary skill in the art having the benefit of this disclosure.

In one or more embodiments, the one or more processors may simply present an informational prompt on the display where two or more persons are within the predefined embodiment. For instance, the prompt may include indicia indicating that entry of the user authentication code to authenticate the person as the authorized user of the electronic device has been precluded. Such a prompt may say, "authentication code entry has been disabled." The prompts may further indicate why the entry of the user authentication code to authenticate the person as the authorized user of the electronic device has been precluded. Such a prompt may say, "Multiple persons have been detected. For your safety and security, as well as the safety and security of your data, authentication code entry has been disabled so that others do not watch you during entry in an effort to steal your code." Other prompts will be obvious to those of ordinary skill in the art having the benefit of this disclosure.

Where an override is allowed, the one or more processors may prompting, at the display when the two or more persons are within the predefined environment, for the entry of a predefined user input overriding the preclusion of entry of the user authentication code to authenticate the person as the authorized user of the electronic device. Such a prompt may say, "Would you like to override this security feature despite the fact that someone might steal your code?" In response to such a prompt, when the user desires to override the preclusion, the one or more processors may receive, from a user interface after the prompting, a user input overriding the preclusion of entry of the user authentication code to authenticate the person as the authorized user of the electronic device. When such an override input is received, i.e., after the one or more processors receive the override input, the one or more processors may then allow entry of the user authentication code by requesting, at the user interface, the entry of the user authentication code to authenticate the person as the authorized user of the electronic device.

Advantageously, embodiments of the disclosure provide a solution to situations in which a person other than the authorized user or device owner is nearby at a viewing angle where the display is visible when the authorized user is inputting an authorization code while unlocking the device, and sees the authorization code. In one or more embodiments, if the authorized user is not alone and desires to unlock the electronic device, the one or more processors of the electronic device preclude the entry of the authorization code by not presenting the authorization code entry screen on the display of the electronic device. However, in some embodiments if the authorized user covers the display with a hand, this is detected by one or more sensors of the electronic device and entry of the authorization code is allowed. Similarly, in other embodiments if the authorized user moves to a private area, the one or more sensors detect that the second person is no longer within the predefined environment of the electronic device and entry of the authorization code is allowed.

Where the electronic device is equipped with a biometric sensor and the authorized user desires to unlock the electronic device in the presence of other people, e.g., where the sensors of the electronic device determine that the person is in a public setting, the biometric sensor, be it a facial scanner, voice recognition device, or other device, defaults as the only option for device access.

When the electronic device is sitting on a table and in a locked state, in one or more embodiments an imager is actuated when the electronic device is moved. In one or more embodiments, when this occurs the imager determines whether the electronic device is in a public or private setting. If the setting is public, the biometric sensor will attempt to authenticate a person as the authorized user of the electronic device. It should be noted that, in one or more embodiments, rather than sensors determining the electronic device is in a public setting, the user can deliver user input to the electronic device to indicate that the device is in a public setting, thereby placing the electronic device in a private mode.

When in the private mode, an imager or audio sensor can detect that the person is the only person in the environment, perhaps by capturing images of the electronic device being tightly coupled with the user or by a light sensor indicating shadows when the user covers the display with the hand. Where this occurs, entry of the authentication code can be enabled. Thus, in one or more embodiments when a user is attempting to unlock an electronic device in a public environment, entry of user authentication data or a user authentication code is precluded, with biometric authentication being the only option. In one or more embodiments a prompt is presented on the display indicating why authentication code entry is not available, as described above.

Advantageously, when someone, such as a friend or family member or a stranger, is detected to be looking at a display of an electronic device and is within a readable range/distance from the electronic device, a PIN entry screen is disabled. Reasons why this is occurring can be presented on the display so that the user understands what is happening. During such user authentication code preclusion states, one or more processors of the electronic device can provide other options to authenticate, e.g., a fingerprint sensor, a facial scanner, a voice recognition system, or other system.

In one or more embodiments, in this non-private compromised security setting, in addition to disabling PIN screen, a prompt is presented to the user notifying them that the content presented on the display can be read by someone near. For example, the prompt may indicate another person is looking from a certain direction and is within a predefined distance of the electronic device and the background lighting is such that the other person can likely read the display.

In one or more embodiments, the user can still enable PIN screen if they choose by turning to face the person and/or crowd making screen content non viewable by others or covering screen. This prompt to act reinforces how users should always behave in the presence of others when accessing device. Moreover, specific instructions on how to act provide a call to action that can be more likely to make the user act than by simply notifying user he is not in a private setting. Other embodiments are explained below. Still others will be obvious to those of ordinary skill in the art having the benefit of this disclosure.

Turning now to FIG. 1, illustrated therein is one explanatory electronic device 100 configured in accordance with one or more embodiments of the disclosure. Also shown in FIG. 1 are one or more method steps for the electronic device 100. This illustrative electronic device 100 includes a biometric sensor that can be used for authentication. The biometric sensor used for illustrative purposes is a combination of an imager 102 and a depth scanner 105. These devices can optionally be used with a thermal sensor 112. It should be noted, however, that this biometric sensor could be replaced by another biometric sensor. Examples of other biometric sensors include fingerprint sensors, voice authentication systems, and iris scanners. Other types of biometric sensors will be obvious to those of ordinary skill in the art having the benefit of this disclosure. It should also be noted that some electronic devices configured in accordance with embodiments of the disclosure will not include any biometric sensors at all.

In the illustrative embodiment of FIG. 1, a user 101 is authenticating himself as an authorized user of the electronic device 100 in accordance with one or more embodiments of the disclosure. In this illustrative embodiment, the authentication process is "touchless" in that the user 101 need not manipulate or interact with the electronic device 100 using his fingers. To the contrary, in accordance with one or more embodiments of the disclosure, the user is authenticated using a combination of two-dimensional imaging and depth scan imaging, optionally thermal sensing, and also optionally one or more higher authentication factors.

In this illustrative embodiment, an imager 102 captures at least one image 103 of an object situated within a predefined radius 104 of the electronic device 100, which in this case is the user 101. In one embodiment, the imager 102 captures a single image 103 of the object. In another embodiment, the imager 102 captures a plurality of images 103,118 of the object. In one or more embodiments, the one or more images 103 are each a two-dimensional image. For example, in one embodiment the image 103 is a two-dimensional RGB image. In another embodiment, the image 103 is a two-dimensional infrared image. Other types of two-dimensional images will be obvious to those of ordinary skill in the art having the benefit of this disclosure.

In one or more embodiments, the image 103 can be compared to one or more predefined reference images 108. By making such a comparison, one or more processors 110 can confirm whether the shape, skin tone, eye color, hair color, hair length, and other features identifiable in a two-dimensional image are that of the authorized user identified by the one or more predefined reference images 108.

In addition to the imager 102 capturing the image 103, in one or more embodiments a depth imager 105 captures at least one depth scan 106 of the object when situated within the predefined radius 104 of the electronic device 100. In one embodiment, the depth imager 105 captures a single depth scan 106 of the object. In another embodiment, the depth imager 105 captures a plurality of depth scans 106 of the object.

The depth imager 105 can take any of a number of forms. These include the use of stereo imagers, separated by a predefined distance, to create a perception of depth, the use of structured light lasers to scan patterns—visible or not—that expand with distance and that can be captured and measured to determine depth or projecting different patterns, time of flight sensors that determine how long it takes for an infrared or laser pulse to translate from the electronic device 100 to the user 101 and back. Other types of depth imagers will be obvious to those of ordinary skill in the art having the benefit of this disclosure. However, in each case, the depth scan 106 creates a depth map of a three-dimensional object, such as the user's face 107. This depth map can then be compared to one or more predefined facial maps 109 to confirm whether the contours, nooks, crannies, curvatures, and features of the user's face 107 are that of the authorized user identified by the one or more predefined facial maps 109.

In one or more embodiments, the image 103 and the depth scan 106 are used in combination for authentication purposes. Illustrating my example, in one or more embodiments one or more processors 110 compare the image 103 with the one or more predefined reference images 108. The one or more processors 110 then compare the depth scan 106 with the one or more predefined facial maps 109.

Authentication 116 will fail in one or more embodiments unless the image 103 sufficiently corresponds to at least one of the one or more predefined reference images 108 and the depth scan 106 sufficiently corresponds to at least one of the one or more predefined facial maps 109. As used herein, "sufficiently" means within a predefined threshold. For example, if one of the predefined reference images 108 includes 500 reference features, such as facial shape, nose shape, eye color, background image, hair color, skin color, and so forth, the image 103 will sufficiently correspond to at least one of the one or more predefined reference images 108 when a certain number of features in the image 103 are also present in the predefined reference images 108. This number can be set to correspond to the level of security desired. Some users may want ninety percent of the reference features to match, while other users will be content if only eighty percent of the reference features match, and so forth.

As with the predefined reference images 108, the depth scan 106 will sufficiently match the one or more predefined facial maps 109 when a predefined threshold of reference features in one of the facial maps is met. In contrast to two-dimensional features found in the one or more predefined reference images 108, the one or more predefined facial maps 109 will include three-dimensional reference features, such as facial shape, nose shape, eyebrow height, lip thickness, ear size, hair length, and so forth. As before, the depth scan 106 will sufficiently correspond to at least one of the one or more predefined facial maps 109 when a certain number of features in the depth scan 106 are also present in the predefined facial maps 109. This number can be set to correspond to the level of security desired. Some users may want ninety-five percent of the reference features to match, while other users will be content if only eighty-five percent of the reference features match, and so forth.

The use of both the image 103 and the depth scan 106 as combined authentication factors can be superior to using one or the other alone. The depth scan 106 adds a third "z-dimension" to the x-dimension and y-dimension data found in the image 103, thereby enhancing the security of using the user's face 107 as their password in the process of authentication by facial recognition. Another benefit of using the depth scan 106 in conjunction with the image 103 is the prevention of someone "faking" the imager 102 acting alone by taking an image 103 of a picture of the user 101, rather than the user 101 themselves. Illustrating by example, if only the imager 102 is used, a nefarious person trying to get unauthorized access to the electronic device 100 may simply snap a picture of a two-dimensional photograph of the user 101. The use of a depth scan 106 in conjunction with the image 103 prevents this type of chicanery by requiring that a three-dimensional object, i.e., the actual user 101, be present and within the predefined radius 104 before the authentication system 111 authenticates the user 101.

The opposite is also true. Use of only the depth imager 105, without the imager 102, can be problematic. If only the depth imager 105 is used, a nefarious actor attempting to gain unauthorized access to the electronic device 100 may create a three-dimensional, lifelike mask of the user 101. However, the use of the image 103 in conjunction with the depth scan 106 prevents this, as features of the user 101 that are hard to replicate with a mask are verified from the image 103, which is a RGB image in one or more embodiments. Features such as facial shape, nose shape, eye color, hair color, skin color, and so forth can be sufficiently verified by comparing the image 103 to the one or more predefined reference images 108. Advantageously, the use of the image in conjunction with the depth scan 106 prevents this type of chicanery by capturing a color two-dimensional image of the object, thereby confirming that the object looks like the user 101 in addition to being shaped like the user 101.

While the use of both the image 103 and the depth scan 106 as combined authentication factors can be superior to using one or the other alone, as noted above it is contemplated that a nefarious actor may take even more desperate steps attempt to "spoof" the authentication system 111 if the information stored within the electronic device 100 is sufficiently valuable. Consider the situation where the malefactor goes to the extreme of making a three-dimensional mask of the authorized user with Hollywood-caliber hair and make up so that it is not only shaped like the user 101, but looks like the user 101 as well. While very expensive, such masks can be obtained when the stakes are sufficiently high. If only an image 103 and a depth scan 106 are required for the authentication system 111, this could conceivably result in unauthorized access to the electronic device 100 being obtained.

Advantageously, one or more embodiments of the present disclosure optionally further include an optional thermal sensor 112 to detect an amount of thermal energy 113 received from an object within a thermal reception radius 114 of the electronic device 100. In one or more embodiments where a thermal sensor 112 is included, only where the amount of thermal energy 113 received form the object is within a predefined temperature range 115 will authentication 116 occur, and thus access be granted when the electronic device 100 is unlocked 122.

Advantageously, this prevents the use of three-dimensional masks from "tricking" the authentication system by masquerading as the actual user 101, Buster. Thus, in one or more embodiments, the one or more processors 110 determine whether the amount of thermal energy 113 received from the object, which in this case is the user 101, is within the predefined temperature range 115.

In one or more embodiments, authentication 116 occurs where each of the following is true: the at least one image 103 sufficiently corresponds to at least one of the one or more predefined reference images 108 and the at least one depth scan 106 sufficiently corresponds to at least one of the one or more predefined facial maps 109. Where both are true, in one or more embodiments, the object is authenticated 116 as the user 101 authorized to use the electronic device 100 when the electronic device 100 is unlocked 122.

When a thermal sensor 112 is included, in one or more embodiments, authentication 116 occurs where each of the following is true: the at least one image 103 sufficiently corresponds to at least one of the one or more predefined reference images 108; the at least one depth scan 106 sufficiently corresponds to at least one of the one or more predefined facial maps 109; and the amount of thermal energy 113 received from the object is within the predefined temperature range 115. Where all three are true, in one or more embodiments, the object is authenticated 116 as the user 101 authorized to use the electronic device 100 when the electronic device 100 is unlocked 122.

In one or more embodiments, when the authentication 116 fails, for whatever reason, the one or more processors 110 detect that a user authentication failure of the biometric sensor has occurred. In one or more embodiments, the one or more processors 110 then request entry 117 of a user authentication code via a prompt or other notification or indicia presented on a user interface of the electronic device 100. Examples of user authentication codes include PINs, passwords, passcodes, identifying phrases, answers to predefined questions, and so forth. Other examples of user authentication codes will be obvious to those of ordinary skill in the art having the benefit of this disclosure.

The user 107 can then enter the user authentication code 119 at the user interface of the electronic device 100. A second authentication process 120 can then occur. If the user authentication code 119 sufficiently matches a stored user authentication code, the object is authenticated 117 as the user 101 authorized to use the electronic device 100 when the electronic device 100 is unlocked 122. However, when the user authentication code 119 fails to sufficiently match a stored user authentication code, the one or more processors 110 can lock 121 or limit full access the electronic device 100 to preclude access to it or the information stored therein.

In one or more embodiments, the authentication system 111 can determine a distance between the object and the electronic device 100. For example, in one embodiment the authentication system 111, using the scaling from the image 103 or the distance calculated using the depth scan 106, can determine how far the electronic device 100 is from the user's face 107. In such an embodiment, the authentication 116 can occur only when the determined distance is within a predefined range.

For example, in one or more embodiments the image, depth scan, and temperature must be captured within a predefined range definable by a user in a device menu, e.g., between a distance of one and two feet, for authentication 116 to successfully occur. This could be driven by environmental conditions where user motion, background darkness, or crowd presence shortens maximum distance for triggering authentication. Accordingly, in one or more embodiments the authenticating 117 occurs only when the at least one image 103 sufficiently corresponds to at least one of the one or more predefined reference images 108, the at least one depth scan 106 sufficiently corresponds to at least one of the one or more predefined facial maps 109, the amount of thermal energy 113 received from the object falls within the predefined temperature range 115, and the determined distance between the user 101 and the electronic device 100 is within a predefined distance range, such as between one and two feet.

In other embodiments, device orientation can be used as an authentication factor. For example, detecting whether the electronic device 100 is oriented so as to capture a "selfie," as shown in FIG. 1, or an image from the rear imager prevents someone from getting access to an electronic device 100, pointing it in the direction of the authorized user, capturing a rearward shot, and obtaining access to the electronic device 100. Accordingly, in one or more embodiments the authenticating 117 occurs only when the at least one image 103 sufficiently corresponds to at least one of the one or more predefined reference images 108, the at least one depth scan 106 sufficiently corresponds to at least one of the one or more predefined facial maps 109, the amount of thermal energy 113 received from the object falls within the predefined temperature range 115, and the orientation of the electronic device 100 matches one or more predefined orientation criteria, such as the fact that the image 103 is a selfie and not one captured by a rearward facing camera. Other authentication factors will be described below. Still others will be obvious to those of ordinary skill in the art having the benefit of this disclosure.

Figure 2:
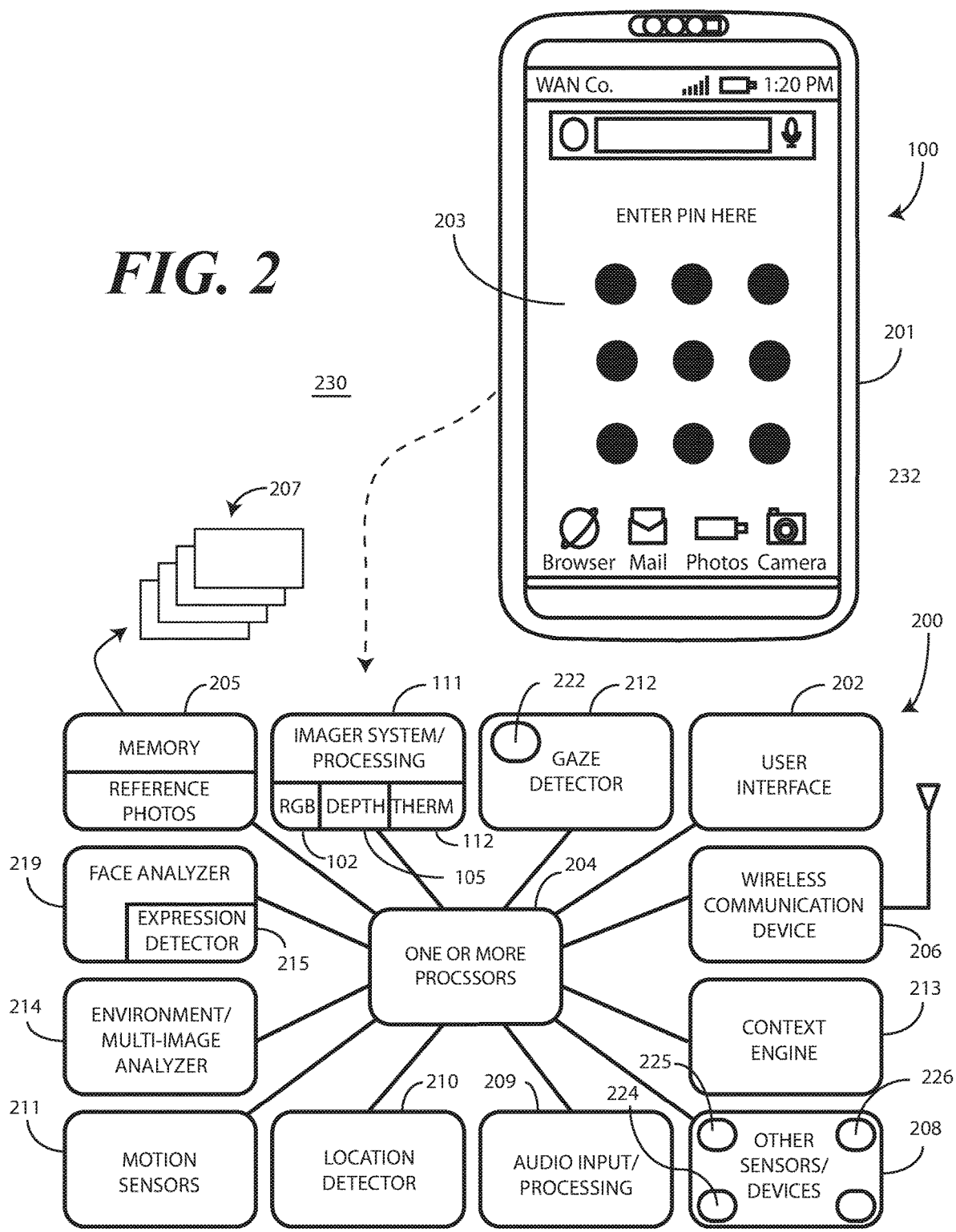
FIG. 2 illustrates one explanatory electronic device in accordance with one or more embodiments of the disclosure.

Turning now to FIG. 2, illustrated therein is one explanatory block diagram schematic 200 of one explanatory electronic device 100 configured in accordance with one or more embodiments of the disclosure. The electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the block diagram schematic 200 could be used with other devices as well, including conventional desktop computers, palm-top computers, tablet computers, gaming devices, media players, wearable devices, or other devices. Still other devices will be obvious to those of ordinary skill in the art having the benefit of this disclosure.

In one or more embodiments, the block diagram schematic 200 is configured as a printed circuit board assembly disposed within a housing 201 of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 includes a display 203, which may optionally be touch-sensitive. In one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMOLED) display. However, it should be noted that other types of displays, including liquid crystal displays, suitable for use with the user interface 202 would be obvious to those of ordinary skill in the art having the benefit of this disclosure.

In one embodiment, the electronic device includes one or more processors 204. In one embodiment, the one or more processors 204 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 205, can optionally store the executable software code used by the one or more processors 204 during operation.

In this illustrative embodiment, the block diagram schematic 200 also includes a communication circuit 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 206 can include wireless communication circuitry, one of a receiver, a transmitter, or transceiver, and one or more antennas.

In one embodiment, the one or more processors 204 can be responsible for performing the primary functions of the electronic device with which the block diagram schematic 200 is operational. For example, in one embodiment the one or more processors 204 comprise one or more circuits operable with the user interface 202 to present presentation information to a user. The executable software code used by the one or more processors 204 can be configured as one or more modules 207 that are operable with the one or more processors 204. Such modules 207 can store instructions, control algorithms, and so forth.

In one or more embodiments, the block diagram schematic 200 includes an audio input/processor 209. The audio input/processor 209 can include hardware, executable code, and speech monitor executable code in one embodiment. The audio input/processor 209 can include, stored in memory 205, basic speech models, trained speech models, or other modules that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models to identify speech commands.

In one embodiment, the audio input/processor 209 is configured to implement a voice control feature that allows a user to speak a specific device command to cause the one or more processors 204 to execute a control operation. For example, the user may say, "Authenticate Me Now." This statement comprises a device command requesting the one or more processors to cooperate with the authentication system 111 to authenticate a user. Consequently, this device command can cause the one or more processors 204 to access the authentication system 111 and begin the authentication process. In short, in one embodiment the audio input/processor 209 listens for voice commands, processes the commands and, in conjunction with the one or more processors 204, performs a touchless authentication procedure in response to voice input.

Various sensors can be operable with the one or more processors 204. FIG. 2 illustrates several examples such sensors. It should be noted that those shown in FIG. 2 are not comprehensive, as others will be obvious to those of ordinary skill in the art having the benefit of this disclosure. Additionally, it should be noted that the various sensors shown in FIG. 2 could be used alone or in combination. Accordingly, many electronic devices will employ only subsets of the sensors shown in FIG. 2, with the particular subset defined by device application.

A first example of a sensor that can be included with the other components 208 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 204, to detect an object in close proximity with—or touching—the surface of the display 203 or the housing of an electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor is a geo-locator that serves as a location detector 210. In one embodiment, location detector 210 is able to determine location data when the touchless authentication process occurs by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAV STAR) Global Positioning Systems (GPS) in the United States of America, the Global Orbiting Navigation System (GLONASS) in Russia, and other similar satellite positioning systems. The satellite positioning systems based location fixes of the location detector 210 autonomously or with assistance from terrestrial base stations, for example those associated with a cellular communication network or other ground based network, or as part of a Differential Global Positioning System (DGPS), as is well known by those having ordinary skill in the art. The location detector 210 may also be able to determine location by locating or triangulating terrestrial base stations of a traditional cellular network, such as a CDMA network or GSM network, or from other local area networks, such as Wi-Fi networks.

One or more motion detectors 211 can be configured as an orientation detector that determines an orientation and/or movement of the electronic device 100 in three-dimensional space. Illustrating by example, the motion detectors 211 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The motion detectors 211 can determine the spatial orientation and/or motion of an electronic device 100 in three-dimensional space by, for example, detecting a gravitational direction and acceleration due to applied forces. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

A gaze detector 212 can comprise sensors for detecting the user's gaze point. The gaze detector 212 can include an iris scanner 222. The gaze detector 212 can optionally include sensors for detecting the alignment of a user's head in three-dimensional space. Electronic signals can then be processed for computing the direction of user's gaze in three-dimensional space. The gaze detector 212 can further be configured to detect a gaze cone corresponding to the detected gaze direction, which is a field of view within which the user may easily see without diverting their eyes or head from the detected gaze direction. The gaze detector 212 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 212 of FIG. 2.

Other components 208 operable with the one or more processors 204 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 208 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 201 of the electronic device 100. In one embodiment, the signal receiver is an infrared signal receiver to receive an infrared emission from an object such as a human being when the human is proximately located with the electronic device 100. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 204 can cause each proximity sensor component to operate at a first "effective" sensitivity so as to receive infrared emissions from a first distance. Similarly, the one or more processors 204 can cause each proximity sensor component to operate at a second sensitivity, which is less than the first sensitivity, so as to receive infrared emissions from a second distance, which is less than the first distance. The sensitivity change can be effected by causing the one or more processors 204 to interpret readings from the proximity sensor component differently.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 208 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 208 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device. The other components 208 can also include a flash 224. The other components 208 can also include an fingerprint sensor 225 or retina scanner 226.

A context engine 213 can then operable with the various sensors to detect, infer, capture, and otherwise determine persons and actions that are occurring in an environment about the electronic device 100. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information.

The context engine 213 can comprise an artificial neural network or other similar technology in one or more embodiments.

In one or more embodiments, the context engine 213 is operable with the one or more processors 204. In some embodiments, the one or more processors 204 can control the context engine 213. In other embodiments, the context engine 213 can operate independently, delivering information gleaned from detecting multi-modal social cues, emotional states, moods, and other contextual information to the one or more processors 204. The context engine 213 can receive data from the various sensors. In one or more embodiments, the one or more processors 204 are configured to perform the operations of the context engine 213.

As previously described, in one illustrative embodiment the authentication system 111 includes an imager 102 and a depth imager 105. The authentication system 111 can optionally include a thermal sensor 112. In one embodiment, the imager 102 comprises a two-dimensional imager configured to receive at least one image of a person within an environment of the electronic device 100. In one embodiment, the imager 102 comprises a two-dimensional RGB imager. In another embodiment, the imager 102 comprises an infrared imager. Other types of imagers suitable for use as the imager 102 of the authentication system will be obvious to those of ordinary skill in the art having the benefit of this disclosure.

The thermal sensor 112, where included, can also take various forms. In one embodiment, the thermal sensor 112 is simply a proximity sensor component included with the other components 208. In another embodiment, the thermal sensor 112 comprises a simple thermopile. In another embodiment, the thermal sensor 112 comprises an infrared imager that captures the amount of thermal energy emitted by an object. Other types of thermal sensors 112 will be obvious to those of ordinary skill in the art having the benefit of this disclosure.

The depth imager 105 can take a variety of forms. In a first embodiment, the depth imager 105 comprises a pair of imagers separated by a predetermined distance, such as three to four images. This "stereo" imager works in the same way the human eyes do in that it captures images from two different angles and reconciles the two to determine distance.

In another embodiment, the depth imager 105 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 105 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 105 adds a third "z-dimension" to the x-dimension and y-dimension defining the two-dimensional image captured by the imager 102, thereby enhancing the security of using a person's face as their password in the process of authentication by facial recognition.

The authentication system 111 can be operable with a face analyzer 219 and an environmental analyzer 214. The face analyzer 219 and/or environmental analyzer 214 can be configured to determine, for example, whether the user 108 is the only person within a predefined environment 230 of the electronic device 100, or whether multiple people are within the predefined environment 230 of the electronic device 100. The predefined environment 230 is "predefined" because it is defined by a signal reception radius, similar to predefined radius (104) of FIG. 1, within which the various components 208 of the electronic device 100 can receive reliable signals.

The face analyzer 219 and/or environmental analyzer 214 can also be configured to process an image or depth scan of an object and determine whether the object matches predetermined criteria. For example, the face analyzer 219 and/or environmental analyzer 214 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 214, operating in tandem with the authentication system 111, can be used as a facial recognition device to determine the identity of one or more persons detected about the electronic device 100.

Illustrating by example, in one embodiment when the authentication system 111 detects a person, one or both of the imager 102 and/or the depth imager 105 can capture a photograph and/or depth scan of that person. The authentication system 111 can then compare the image and/or depth scan to one or more reference files stored in the memory 205. This comparison, in one or more embodiments, is used to confirm beyond a threshold authenticity probability that the person's face—both in the image and the depth scan—sufficiently matches one or more of the reference files.

Beneficially, this optical recognition performed by the authentication system 111 operating in conjunction with the face analyzer 219 and/or environmental analyzer 214 allows access to the electronic device 100 only when one of the persons detected about the electronic device are sufficiently identified as the owner of the electronic device 100. Accordingly, in one or more embodiments the one or more processors 204, working with the authentication system 111 and the face analyzer 219 and/or environmental analyzer 214 can determine whether at least one image captured by the imager 102 matches a first predefined criterion, whether at least one facial depth scan captured by the depth imager 105 matches a second predefined criterion, and whether the thermal energy identified by the thermal sensor 112 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 204 authenticate a person as an authorized user of the electronic device when the at least one image matches the first predefined criterion, the at least one facial depth scan matches the second predefined criterion, and the thermal energy matches the third predefined criterion.

In one or more embodiments, the face analyzer 219 can also include an image/gaze detection-processing engine. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 102 or the depth imager 105 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

In one or more embodiments, the face analyzer 219 is further configured to detect mood. The face analyzer 219 can infer a person's mood based upon contextual information received from the imager 102 and/or depth imager 105. For example, if a picture, a depth scan, multiple successive pictures, multiple successive depth scans, video, or other information from which a person can be identified as the owner of the electronic device 100 indicate that the owner is crying, the face analyzer 219 can infer that she is either happy or sad.

The face analyzer 219 can similarly determine emotion in one or more embodiments.

Illustrating by example, a picture, a depth scan, multiple successive pictures, multiple successive depth scans, video, or other information relating to of the owner of an electronic device can allow an expression detector 215 to determine the inference of their silently communicated emotional state, e.g. joy, anger, frustration, and so forth. This can be inferred from, for example, facial expressions such as a raised eyebrow, grin, or other feature. In one or more embodiments, such emotional cues can be used as a secret password for authentication in addition to the face.

Figure 3:
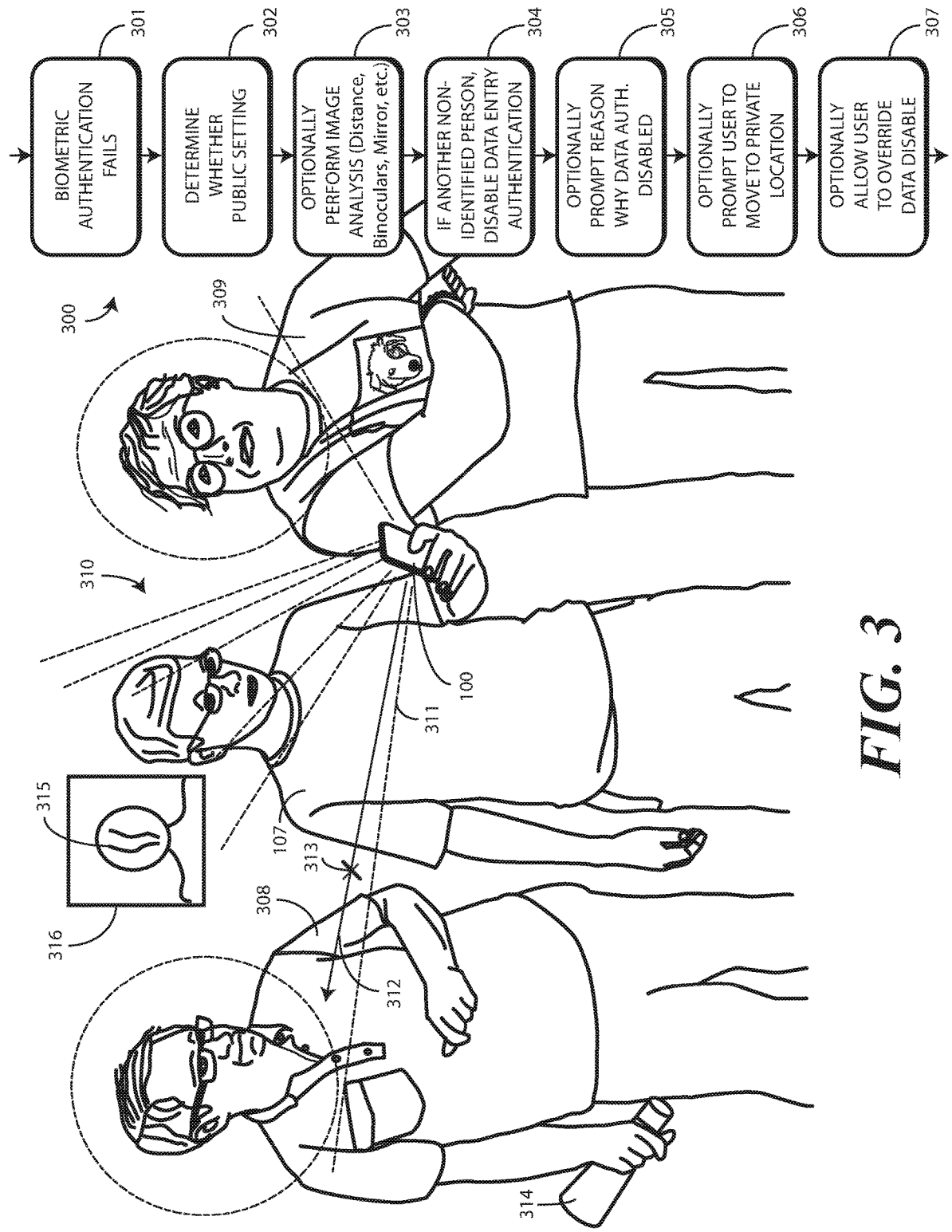
FIG. 3 illustrates one or more explanatory method steps in accordance with one or more embodiments of the disclosure.

For completeness, FIG. 2 illustrates one embodiment of a user authentication input user interface 232. The presentation of such a user authentication input user interface 232 is precluded when the electronic device 100, or more particularly, its display 203 or user interface 202 is in the view of persons that are potentially not the authorized user or owner of the electronic device 100 in accordance with one or more embodiments of the disclosure. In this illustrative embodiment, the user authentication input user interface 232 is a PIN entry presentation with which the user may touch user actuation targets presented on the display 203 to enter a numeric or alphanumeric code identifying the user as an authorized user or owner of the electronic device 100. FIG. 3 will illustrate one or more ways in which this preclusion will occur.

Turning now to FIG. 3, illustrated therein is the user 107 again attempting to authenticate himself using a touchless authentication system, which in this case is a biometric facial recognition system. However, rather than being alone, as was the case in FIG. 1, two nefarious actors 308,309 are within the environment 310 of the electronic device 100 from which signals can be received by the one or more sensors of the electronic device 100. A method 300 is also shown in FIG. 3. The actors 308,309 could be other than nefarious. For example, they could just include a nosy friend or relative. In any event, for the purposes of this illustration, one or more of the actors 308,309 is not an authorized user of the electronic device 100, but desires to gain access to the information stored therein.

As noted above, embodiments of the disclosure contemplate that, at times, a biometric sensor may be unsuccessful in authenticating the person 107 as an authorized user of the electronic device 100. Where this occurs, one or more processors (204) of the electronic device 100 detect a user authentication failure at step 301. If the electronic device 100 had no biometric sensor, step 301 would be omitted.

Ordinarily, the next step would be to request entry (117) of a user authentication code via a prompt or other notification or indicia presented on a user interface of the electronic device 100. The user 107 could then enter the user authentication code (119) at the user interface of the electronic device 100. However, in this embodiment the two actors 308,309 are watching the electronic device 100 closely hoping to see what the user authentication code is so that they scan snoop through the user's text messages when the user 107 is away from the electronic device 100.

Advantageously, to stop this, at step 302 the method 300 determines at step 302, using one or more sensors of the electronic device 100, whether one or more persons are within the predefined environment 310 of the electronic device 100, which in this case there are. This determination can be made in a number of ways.

Illustrating by example, an imager (102) of the electronic device 100 may capture an image of the predefined environment 310. The authentication system (111), the face analyzer (219), the environmental analyzer (214), the one or more processors (204), or another component of the electronic device 100 can then analyze that image to determine whether multiple persons are within the predefined environment 310. Alternatively, an audio input/processor (209) may capture audio from the predefined environment 310, and can analyze this audio input to detect multiple persons within the predefined environment 310. In other embodiments, the depth scanner 105 can capture depth scans of multiple people. The gaze detector (212) may detect the gaze of more than one person toward the electronic device 100. The communication circuit (206) may detect radio frequency signals coming from electronic devices belonging to the other people within the predefined environment 310.

In a simpler embodiment, the user 107 simply delivers user input to the user interface (202) of the electronic device 100 that indicates two or more people are within the predefined environment 310. Said differently, in one or more embodiments step 302 comprises receiving, from the user interface (202) of the electronic device 100, user input indicating that the two or more persons are within the predefined environment. When the user authentication input user interface (232) is presented, for example, the user may enter #######, rather than the PIN, to alert the one or more processors (204) of the electronic device 100 that multiple persons are within the predefined environment 310. Other techniques for determining whether multiple people are within the predefined environment 310 will be obvious to those of ordinary skill in the art having the benefit of this disclosure.

In one or more embodiments, the imager (102) is the primary tool to determine whether one or more persons are within the predefined environment 310. For instance, in one embodiment the one or more processors (204) determine whether the one or more persons are within the predefined environment 310 of the electronic device 100 by capturing, with the imager (102), one or more images of the predefined environment 310. From there, at optional step 303 one or more of the authentication system (111), the face analyzer (219), the environmental analyzer (214), the one or more processors (204), or another component of the electronic device 100 can perform image analysis on images captured by the imager (102) to detect conditions within the predefined environment 310 that may affect the ability of the two nefarious actors 308,309 to see the display (203) of the electronic device 100.

Where the components and systems of the electronic device 100 conclude that the nefarious actors 308,309 have a line of sight to the display (203) of the electronic device 100, in one or more embodiments the one or more processors (204) will preclude entry of the user authentication code to authenticate the user 107 as an authorized user of the electronic device 100. However, where the components and systems of the electronic device 100 conclude that the display (203) is not viewable by the nefarious actors, the one or more processors will allow entry of the user authentication code to authenticate the user 107 as an authorized user of the electronic device 100. A few use cases will illustrate conditions for precluding or allowing entry of the user authentication code.

Illustrating by example, in one or more embodiments, the imager (102) defines a field of view 311 for the one or more images. As is known in the art, the field of view 311 of the imager is the area of inspection that captured by the imager (102). In many cases, this field of view 311 can be adjusted by adjusting the settings of the imager (102).

In one or more embodiments, the imager (102) is designed such that the field of view 311 can be set to define a viewing angle within which the display (203) can be seen. For instance, in the illustrative embodiment of FIG. 3, the field of view 311 is set wide enough that any person standing within the field of view can likely see the display (203). As shown in FIG. 3, both of the actors 308,309 are within the field of view 311. Since this is the case, the nefarious actors 308,309 likely can see the display (203) of the electronic device 100. The gaze detector (212) of the electronic device 100 can further confirm this by performing image analysis to detect that, in this illustration, both actors 308,309 are secretly gazing at the display (203) of the electronic device 100 while the user 107 is attempting to authenticate himself as an authorized user of the electronic device 100.

Since this is the case, at step 304 the method precludes entry of the user authentication code at the user interface to authenticate the user 107 as a person who is the authorized user of the electronic device 100. This means that the user authentication input user interface (232) would not be presented on the display. Accordingly, the user 107 is unable to touch user actuation targets presented on the display (203) to enter a numeric or alphanumeric code identifying the user 107 as an authorized user or owner of the electronic device 100. Advantageously, this prevents the nefarious actors 308,309 from secretly watching and obtaining the user authentication code.

There are, however, situations in which entry of the authentication code would be permissible even when multiple persons are within the environment of the electronic device 100. This is true because whether the actors 308,309 can actually see the electronic device 100 can be an important factor in determining whether to preclude entry of the authentication code. Illustrating by example, if the nefarious actors 308,309 are too far away from the electronic device 100, it may be possible to allow entry of the user authentication code without fear of it being compromised simply because the nefarious actors 308,309 cannot sufficiently see the display (203) of the electronic device 100. However, if the nefarious actors 308,309 were far away but were using binoculars or a telescope, allowing entry of the user authentication code could be problematic.

Accordingly, in one or more embodiments the one or more processors (204) of the electronic device 100 verify, at step 303, by analyzing the one or more images, whether a distance 312 between all but one person of the two or more persons is beyond a predefined distance threshold. Alternatively, the authentication system (111) can determine the distance 312 between the actors 308,309 and the electronic device 100 by using the scaling from the captured images using the depth scanner (105). In other embodiments, proximity detector components can use a signal emitter that transmits a beam of infrared light that reflects from a nearby object and is received by a corresponding signal receiver, which can be used to compute the distance 312 between the actors 308,309 and the electronic device 100.

Embodiments of the disclosure contemplate that when the actors 308,309 are beyond a predefined distance 312, they will be unable to discern what is being entered into the user interface (202) of the electronic device 100. Accordingly, the preclusion of entry of the user authentication code or data at step 304 will be unnecessary. As such, in one or more embodiments rather than precluding this entry, the one or more processors (204) will prompt, at the user interface (202) for entry of the user authentication code to authenticate the person as the authorized user of the electronic device 100 when all but one person, e.g., user 107, of the people within the predefined environment 310 is beyond a predefined distance threshold 313.

However, as noted above, embodiments of the disclosure contemplate there can be scenarios when all of the nefarious actors 308,309 are beyond a predefined distance threshold 313, but those far-away persons can still see the user interface (202) of the electronic device 100. For example, in one or more embodiments the actors 308,309 may be using binoculars, telescopes, or other auxiliary lensed optical instrument 314. Accordingly, in one or more embodiments step 303 includes the environmental analyzer (214) or other component of the electronic device 100 determines, by analyzing the one or more images, whether people within the field of view 311 or within the predefined embodiment are using an auxiliary lensed optical instrument 314 such as binoculars or a telescope. The term "auxiliary" is used to distinguish distance-based lensed optical instruments, such as binoculars or telescopes, from corrective vision lensed instruments such as eyeglasses and contact lenses. Where any of the people are using an auxiliary lensed optical instrument 314, despite the fact that they are beyond the predefined distance 312, step 304 will include precluding the entry of the user authentication code to authenticate the person 107 as the authorized user of the electronic device 100.

Embodiments of the disclosure contemplate that the authentication system (111), the face analyzer (219), the environmental analyzer (214), the one or more processors (204), or another component of the electronic device 100 can, under certain conditions, initially mistakenly conclude there are multiple persons within the predefined environment 310. This can occur when, for example, a mirror 316 is disposed behind the user 107. When this happens, the environmental analyzer (214) may think that the reflection 315 of the user 107 is instead a second person.

Accordingly, in one or more embodiments step 303 includes determining, by analyzing the one or more images, authentication system (111), the face analyzer (219), the environmental analyzer (214), the one or more processors (204), or another component of the electronic device 100, whether all but one person of the two or more persons is a mirrored reflection 315 of the all but one person. Said differently, in one embodiment step 303 comprises determining, with the authentication system (111), the face analyzer (219), the environmental analyzer (214), the one or more processors (204), or another component of the electronic device 100, whether the perceived other person is a mirror image of the user 107. Where this is the case, i.e., where the all but one person of the two or more persons is the mirrored reflection 316 of the all but one person, the one or more processors may skip the precluding of step 304 and will instead requesting entry of the user authentication code at the user interface (202) to authenticate the all but one person as the authorized user of the electronic device (100).

Step 304 comprises, where two or more persons are within the predefined environment 310, precluding entry of the user authentication code at the user 107 interface to authenticate the user 107 as the authorized user of the electronic device 100. As noted, this preclusion step prevents an unauthorized user from spying on the display in an effort to see what the authorized user's authentication code is during entry of the same. By contrast, where only one person is within the predefined environment, step 304 comprises requesting entry of a user authentication code at the user interface to authenticate that person as an authorized user of the electronic device. In this illustration, the nefarious actors 308,309 are in the predefined environment 310, can see the display (203), and are gazing at the display (203). Accordingly, the former would be performed, and entry of the user authentication code would be precluded.

Embodiments of the disclosure contemplate that it is conceivable that the user 107 may forget that the preclusion of the entry of the user authentication code at the user interface of the electronic device 100 is for their own safety and security. If the user 107 is particularly absent minded, or is simply having an off day, they may think that the electronic device 100 is not working properly. To ensure this is not the case, in one or more embodiments the one or more processors (204) of the electronic device 100 prompt the user 107 by presenting helpful indicia on the display (203) or user interface (202) of the electronic device 100.

Illustrating by example, in one embodiment optional step 305 comprises presenting indicia at the user interface (202) of the electronic device 100 when the two or more persons are within the predefined environment 310. In one or more embodiments, these indicia indicates that entry of the user authentication code to authenticate the user 107 as the authorized user of the electronic device 100 has been precluded. The indicia might say, "PIN ENTRY DISABLED." Alternatively, the indicia might be a large picture of a STOP sign. Alternatively, the indicia may just be a blank screen where the user authentication input user interface (232) would normally appear. Other examples of suitable indicia indicating that entry of the user authentication code has been precluded will be obvious to those of ordinary skill in the art having the benefit of this disclosure.

In one or more embodiments, optional step 305 includes not only presenting indicia that entry of the user authentication code is precluded, but why it is precluded as well. Accordingly, in one or more embodiments step 305 comprises presenting additional indicia, at the user interface (202) when the two or more persons are within the predefined environment 310. In one or more embodiments the additional indicia indicates why the entry of the user authentication code to authenticate the person as the authorized user of the electronic device has been precluded. The indicia might say, "Look out! Other people can see your display! PIN Entry Disabled for your protection!" Alternatively, the indicia might say, "Buster, be careful! People are trying to get your PIN! For this reason, you can't enter your PIN at this time." In another embodiment, the indicia might just be a giant picture of the World War II era "Kilroy" peeking over a wall, which indicates that other people are watching. Other examples of suitable indicia will be obvious to those of ordinary skill in the art having the benefit of this disclosure.

It should be noted that step 305 is optional, due to the fact that it may be safer not to present anything at all. Where the nefarious actors 308,309 are just nosy family members, presenting step 305 does no harm. However, were the nefarious actors 308,309 actual criminals, presentation of this indicia may tip them off that the electronic device 100 can somehow still be unlocked by the user 107, thereby placing additional pressure on the user 107 that he does not need. Accordingly, in one or more embodiments step 305 can be included or excluded via adjustments of the user settings of the electronic device 100. A forgetful user might ensure that step 305 occurs, while a mindful user might disable it, and so forth.

In addition to informational prompts and indicia, instructional prompts and indicia can be presented as well. For example, in one or more embodiments optional step 306 comprises prompting, on a user interface (202) of the electronic device, for the electronic device 100 to be moved to a location where the only one person is within the predefined environment. Such a prompt may say, "Buster, Wait! You need to move to a private location so nobody watches you enter your PIN!" Alternatively, the prompt may say, "People are watching! Move to a private location BEFORE entering your PIN! Now, man!" Other suitable "move somewhere private" prompts will be obvious to those of ordinary skill in the art having the benefit of this disclosure.

Embodiments of the disclosure contemplate that the two actors 308,309 may not be nefarious. They may be best friends of the user 107, and the user 107 may care less whether they know his user authentication code. For that matter, the user 107 may have told them the user authentication code. Alternatively, the electronic device 100 may be a shared electronic device, and each of the actors 308,309 may have their own password. As such, the user 107 may desire to override the preclusion of the entry of the user authentication code. Optional step 307 allows just that.

In one or more embodiments, step 307 comprises prompting, at the user interface (202) of the electronic device 100 when the two or more persons are within the predefined environment 310, for the entry of a user input overriding preclusion of entry of the user authentication code to authenticate the user as the authorized user of the electronic device 100. For example, the one or more processors (204) of the electronic device 100 may cause a message to be presented on the display (203) of the electronic device 100. The message may say, "Buster, do you want to override this important security feature and enter your PIN anyway?" Alternatively, the message may say, "Would you like us to try biometric authentication again? The message may say, "Speak 'override' in your normal tone of voice so that voice analysis can be used to validate that you want this security feature to be overridden." Other suitable messages will be obvious to those of ordinary skill in the art having the benefit of this disclosure.

In one or more embodiments, step 307 then comprises receiving, from the user interface after the prompting, the user input overriding preclusion of entry of the user authentication code to authenticate the person as the authorized user of the electronic device. Where the electronic device 100 includes a biometric sensor, this user input could be biometric. Examples of biometric input include a particular voice, a fingerprint, or facial features. Where the electronic device 100 does not include a biometric sensor, or where the biometric sensor is not functioning properly, in one or more embodiments this user input can be user authentication data that is different that the user authentication code used to unlock the electronic device 100.

Illustrating by example, if the user authentication code used to unlock the device is 2-4-6-8-0, the user input to override the preclusion of its entry might be BSTRWNT-STVRRIDE, which is "Buster wants to override" without the vowels. Other examples of user input used to override the preclusion of the user authentication code will be obvious to those of ordinary skill in the art having the benefit of this disclosure.

As shown and described with reference to FIG. 3, embodiments of the disclosure provide a solution to situations in which a person other than the authorized user or device owner is nearby at a viewing angle where the display (203) of the electronic device 100 is visible when the authorized user is inputting an authorization code while unlocking the device, and sees the authorization code. In one or more embodiments, if the authorized user is not alone and desires to unlock the electronic device 100, the one or more processors (204) of the electronic device 100 preclude the entry of the authorization code by not presenting the user authentication input user interface (232) on the display (203) of the electronic device 100.

Figure 4:
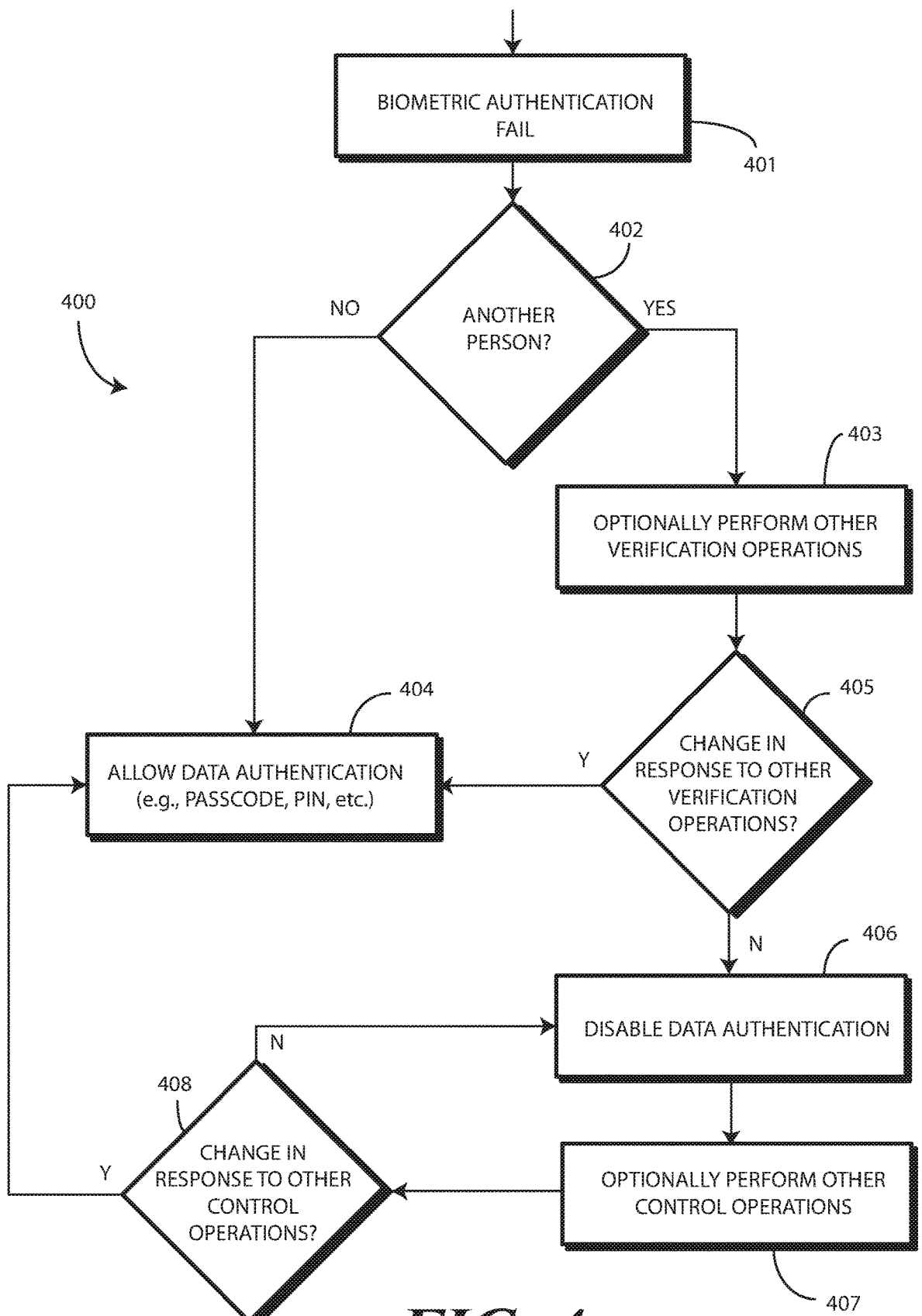
FIG. 4 illustrates one explanatory method in accordance with one or more embodiments of the disclosure.

Turning now to FIG. 4, illustrated therein is one illustrative method 400 for an electronic device in accordance with one or more embodiments of the disclosure. In situations where the electronic device includes a biometric sensor, and the authorized user desires to unlock the electronic device in the presence of other people, e.g., where the sensors of the electronic device determine that the person is in a public setting, the biometric sensor, be it a facial scanner, voice recognition device, or other device, defaults as the only option for device access. Where biometric authentication is successful, the method 400 of FIG. 4 is unnecessary, even in public environments. However, where user authentication failure of the biometric sensor occurs, as detected by step 401, or where the electronic device fails to include a biometric sensor, the method 400 of FIG. 4 is useful in public situations to ensure that an authentication code is not compromised.

Figure 5:
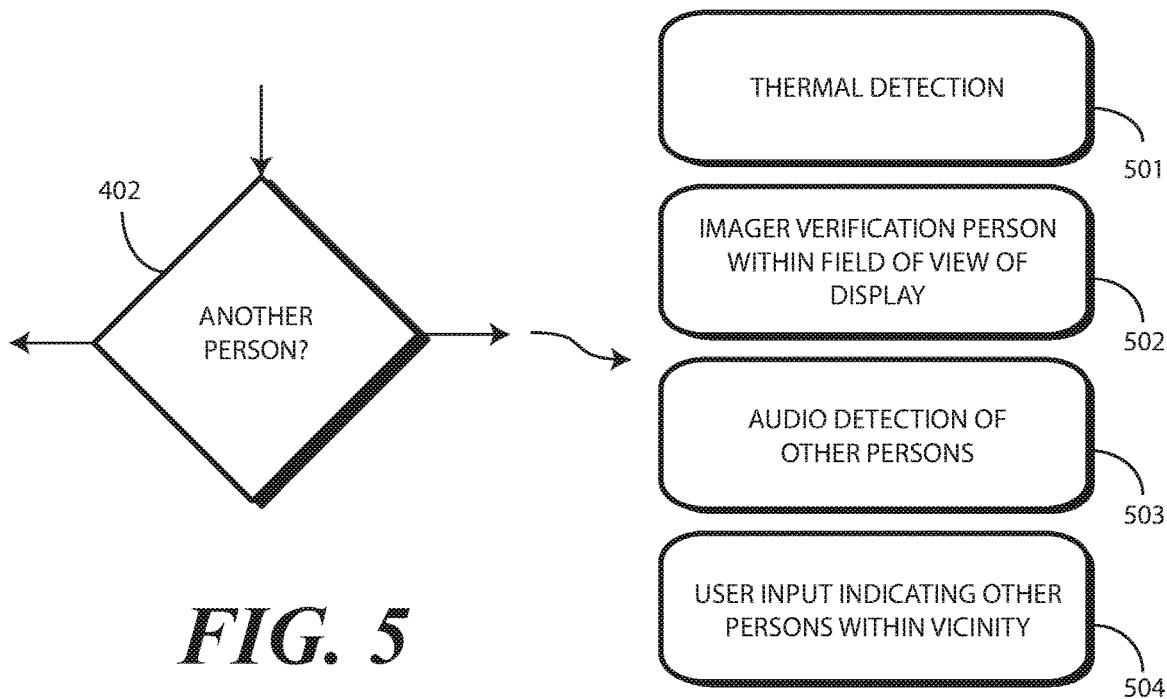
FIG. 5 illustrates one or more explanatory method steps in accordance with one or more embodiments of the disclosure.

At decision 402, the method 400 determines, using one or more sensors of the electronic device, whether two or more persons are within a predefined environment of the electronic device. Turning briefly to FIG. 5, illustrated therein are various ways that decision 402 can be made.

In one or more embodiments, decision 402 is made through thermal detection 501.

Illustrating by example, the electronic device could include proximity sensor components or proximity detector components. The proximity sensor components can be disposed corners of the electronic device. For example, a first proximity sensor component can be disposed at a first corner of the electronic device, while a second proximity sensor component can be disposed at a second corner of the electronic device, and so forth. Similarly, proximity sensor components can be disposed about a perimeter of the electronic device as well.

Each proximity sensor component can be disposed behind a grille that defines one or more apertures through which infrared emissions are received. The grille can define one or more reception beams in which infrared emissions can be received. A cumulative beam reception angle is defined by the angular range at which infrared emissions can be received by a particular proximity sensor component. In one or more embodiments, to provide 360-degree coverage about the housing of the electronic device, the cumulative beam reception angle for each proximity sensor component is obtuse such that it overlaps with at least one other beam reception angle of at least one other proximity sensor component.

The definition of such reception beams advantageously can enable the proximity sensor components to detect not only the location of an object relative to the housing, but also whether one or multiple objects are within a thermal detection radius. Embodiments of the disclosure contemplate that there is a high value in not only detecting presence or motion of a user in a 360-degree coverage area provided by the proximity sensor components, but also in determining where the exact user position is relative to electronic device to determine whether people can see the display. The use of the grille and its corresponding reception beams allows for the detection of multiple people about the housing of the electronic device, even when those people are close to one another. Advantageously, in one or more embodiments this can be detected by sensing infrared emissions by those persons via the reception beams and overlapping the cumulative beam reception angle.

By determining which proximity sensor component, or combination of components, receives an infrared emission, one or more processors of the electronic device can determine where a person or persons may be located about the electronic device. Said differently, in one embodiment the one or more processors can determine whether a single proximity sensor component or multiple proximity sensor components receives the infrared emission to determine a relative location of either a single person or a plurality of people relative to the housing of the electronic device.

In another embodiment, decision 402 is made using image analysis 502. Illustrating by example, an imager of the electronic device may capture an image of the predefined environment about the electronic device. Components of the electronic device can then analyze that image to determine whether multiple persons are within the predefined environment. In one embodiment one or more processors of the electronic device determine whether the one or more persons are within the predefined environment of the electronic device by capturing, with the imager, one or more images of the predefined environment and performing image analysis on images captured by the imager to determine whether multiple persons are within the predefined environment.

In another embodiment decision 402 is made using audio analysis 503. An audio input/processing system may capture audio from the predefined environment, and can analyze this audio input to detect multiple persons within the predefined environment.

In another embodiment, decision 402 can be made as a function of received user input. A user may deliver user input to the user interface of the electronic device that indicates two or more people are within the predefined environment 310. When the user authentication code entry field is presented, for example, the user may enter \*\*\*\*, rather than the PIN, to alert the one or more processors of the electronic device that multiple persons are within the predefined environment. Other techniques for making decision 402 will be obvious to those of ordinary skill in the art having the benefit of this disclosure.

Figure 6:
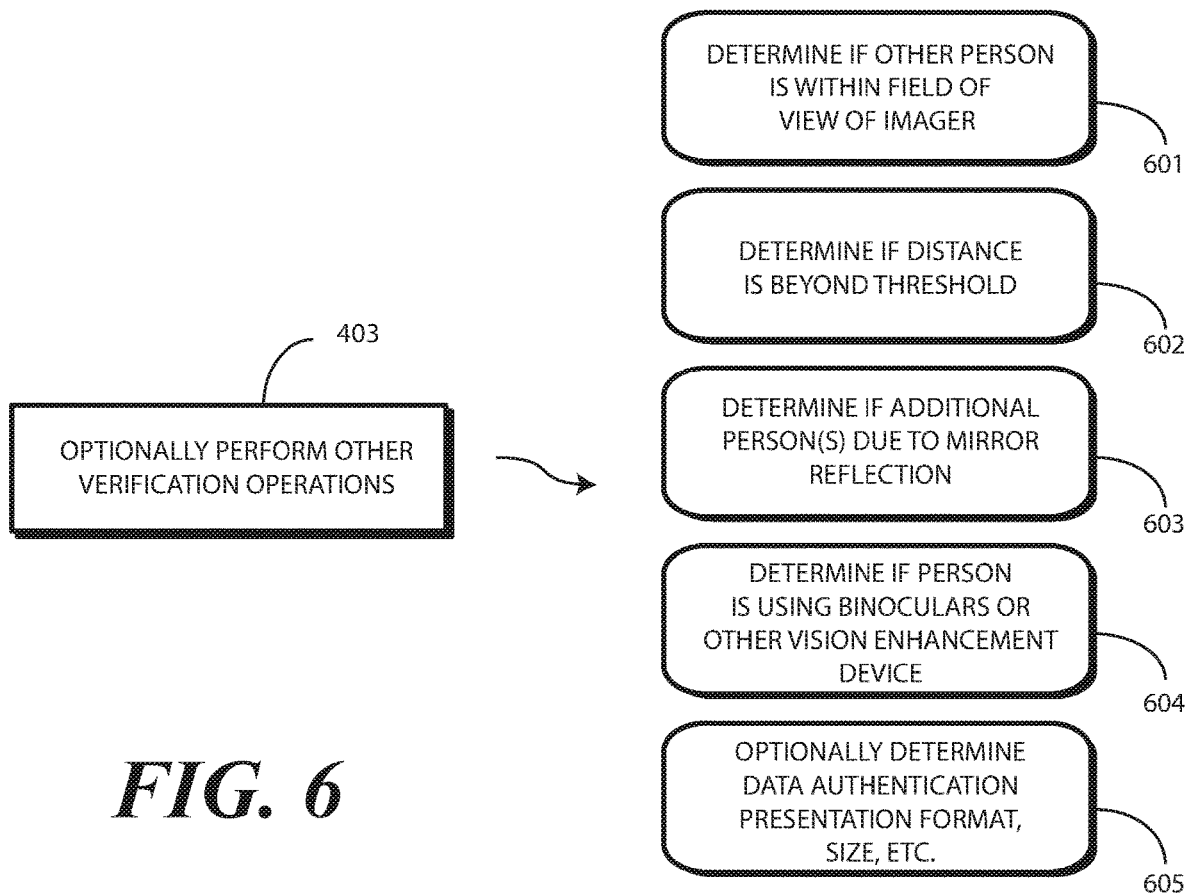
FIG. 6 illustrates one or more explanatory method steps in accordance with one or more embodiments of the disclosure.

Turning back to FIG. 4, where only one person is within the predefined environment, as determined by decision 402, step 404 requests entry of a user authentication code at the user interface to authenticate the only one person as an authorized user of the electronic device. Illustrating by example, step 404 can comprises presenting a user authentication input user interface on a touch sensitive display of the electronic device. One example of a user authentication input user interface is a password entry presentation with which the user may touch user actuation targets presented on the display to enter a numeric or alphanumeric code identifying the user as an authorized user or owner of the electronic device. Other techniques for requesting entry of a user authentication code at the user interface to authenticate the only one person as an authorized user of the electronic device will be obvious to those of ordinary skill in the art having the benefit of this disclosure.

Where two or more persons are within the predefined environment, as determined at decision 402, optional step 403 can occur. Optional step 403 includes performing other verification options to determine whether one or more persons of the two or more persons could see, and potentially obtain, a user authentication code when entered into the electronic device. Turning briefly to FIG. 6, illustrated therein are some examples of optional verification steps that can be performed.

In one embodiment, step 403 comprises determining if at least a second person is within a field of view of a user interface or display of the electronic device at 601. In one embodiment, this can occur with the use of an imager as previously described. Where at least a second person is within the field of view of the user interface or display of the electronic device, it is possible that they may see a user authentication code entry if it is allowed to occur. However, where only one person is within the field of view of the user interface or display, entry of the user authentication code can occur without concern since no one but the single person within the field of view can see the user interface or display.

In one embodiment, step 403 comprises determining if at least a second person is within a field of view of a user interface or display of the electronic device at 602. If all but one person is sufficiently far from the electronic device that they cannot sufficiently see the user interface or display of the electronic device, entry of the user authentication code can occur without concern since only the single person is sufficiently close so as to legibly see the user interface or display. By contrast, when more than one person is within a predefined distance of the electronic device, it is possible that they may see a user authentication code entry if it is allowed to occur.

In one embodiment, step 403 comprises determining if the number of persons minus one detected within the predefined environment of the electronic device are mirrored reflections at 603. As noted above, if a person is standing near one or more mirrors, one or more reflections may be captured by an imager when capturing images of the predefined environment about the electronic device. Accordingly, image analysis can be performed on the images. Where all persons minus one are reflections from a mirror, entry of the user authentication code can occur without concern. By contrast, where at least two people within the predefined environment are not reflections, it is possible that they may see a user authentication code entry if it is allowed to occur.

In one or more embodiments, step 403 comprises determining if any of the two or more persons within the predefined environment are using a vision enhancement device at 604. If, for example, two people are within the predefined environment, and one is far away, ordinarily entry of the user authentication code can occur without concern since no one but the single person could see the display legibly enough to watch what alphanumeric characters were being entered as the user authentication code.

However, if that other person is using a telescope, binoculars, imaging device, or other vision enhancement device, they very well may be able to watch what alphanumeric characters were being entered as the user authentication code. Accordingly, it is possible that they may see a user authentication code entry if it is allowed to occur.

In one or more embodiments, step 403 comprises determining what data is being presented on the display at 605. If, for example, the authentication code entry field is presented in a very small font, it may be hard for another person to legibly see the display when the user authentication code is entered. Accordingly, entry of the user authentication code can occur without concern since only the single person is sufficiently close so as to legibly see the remarkably small font. By contrast, when a giant font is used, it is possible that they may see a user authentication code entry if it is allowed to occur.

Figure 7:
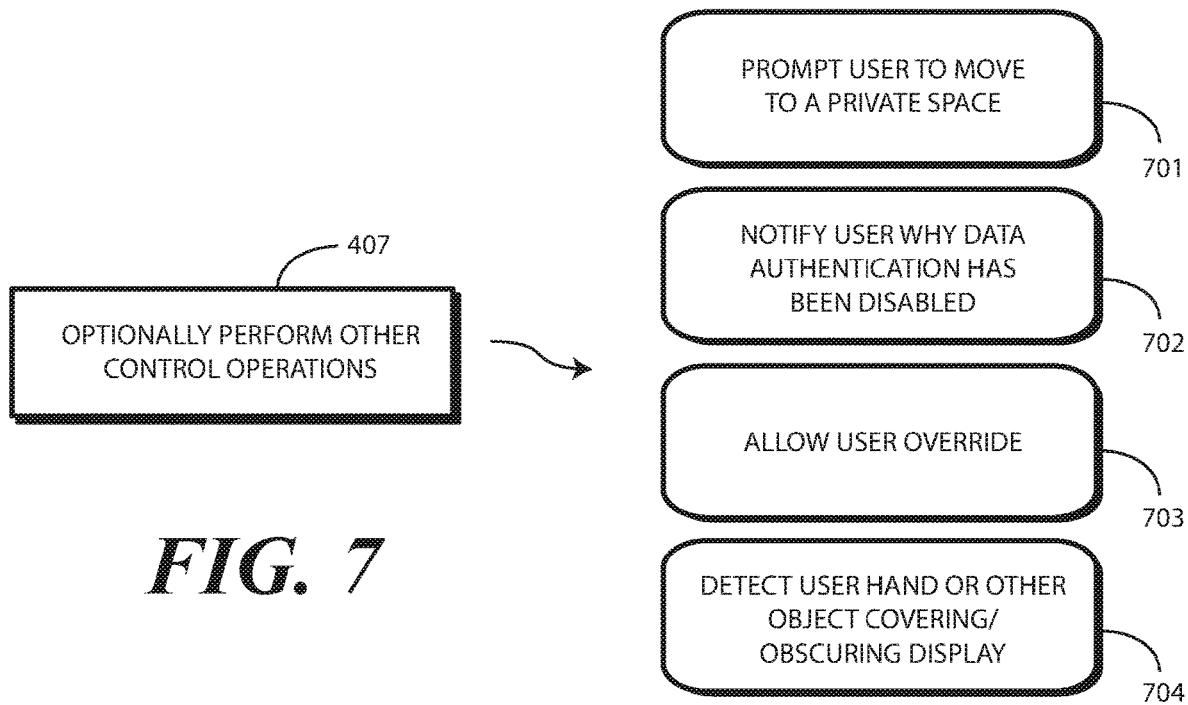
FIG. 7 illustrates one or more explanatory method steps in accordance with one or more embodiments of the disclosure.

Turning now back to FIG. 4, optional decision 405 determines whether any of the verification factors are true or false, as well as whether they change the default mode of the method 400 that causes the preclusion of entry of a user authentication code at a user interface of the electronic device to authenticate a person as an authorized user of the electronic device when the two or more persons are within the predefined environment at step 406. For example, if people were far away, this may change this default mode, sending the method 400 to step 404 where entry of the user authentication code is permitted.

Where entry of the user authentication code has been precluded at step 407, other control operations can optionally be performed at step 407. Turning now to FIG. 7, illustrated therein are several examples of such optional control operations. Others will be obvious to those of ordinary skill in the art having the benefit of this disclosure.

In one embodiment, step 407 comprises prompting, with the one or more processors at the user interface, for the person to move the electronic device to a location where the person is the only person within the predefined environment at step 701. Step 701 can further comprise detecting, with one or more location detectors, both movement of the electronic device to a new location and only one person being within the predefined environment. Where this occurs, the method (400) of FIG. 4 can move from step 407 to step (404), and thereafter request entry of the user authentication code at the user interface to authenticate the only one person as the authorized user of the electronic device.

In one embodiment, step 407 can comprise presenting a notification, with the one or more processors at the user interface, that entry of the user authentication code has been precluded at step 702. Step 702 can further comprise presenting a notification why the entry of the user authentication code has been precluded.

In one embodiment, step 407 can comprise allowing the user to override the preclusion of step (406) of FIG. 4 at step 703. Illustrating by example, step 703 can include prompting, at the user interface when the two or more persons are within the predefined environment, for the entry of a user input overriding preclusion of entry of the user authentication code to authenticate the person as the authorized user of the electronic device. Step 703 can then include receiving, from the user interface after the prompting, the user input overriding preclusion of entry of the user authentication code to authenticate the person as the authorized user of the electronic device and, after receiving the user input, requesting, at the user interface, the entry of the user authentication code to authenticate the person as the authorized user of the electronic device.

In one embodiment, step 407 can comprise, with the one or more other sensors, shielding of the user interface of the electronic device at step 704. This can be accomplished, for example, by capturing an image of a hand over the display, detecting low light at the display with a light detector, or other techniques. Where this occurs, the method (400) of FIG. 4 can move from step 407 to step (404), and thereafter request entry of the user authentication code at the user interface to authenticate the only one person as the authorized user of the electronic device.

Turning now back to FIG. 4, when one or more control operations are performed at step 407, optional decision 408 can determine whether they change the condition of the electronic device causing the preclusion of entry of a user authentication code at a user interface of the electronic device to authenticate a person as an authorized user of the electronic device when the two or more persons are within the predefined environment. If, for example, a hand is placed over the display, thereby obscuring entry of a user authentication code as described above at step (704), this would change the condition, thereby causing the method 400 to move to step 404 where entry of the user authentication code is permitted. If the condition has not changed, the method 400 returns to step 406.

Figure 8:
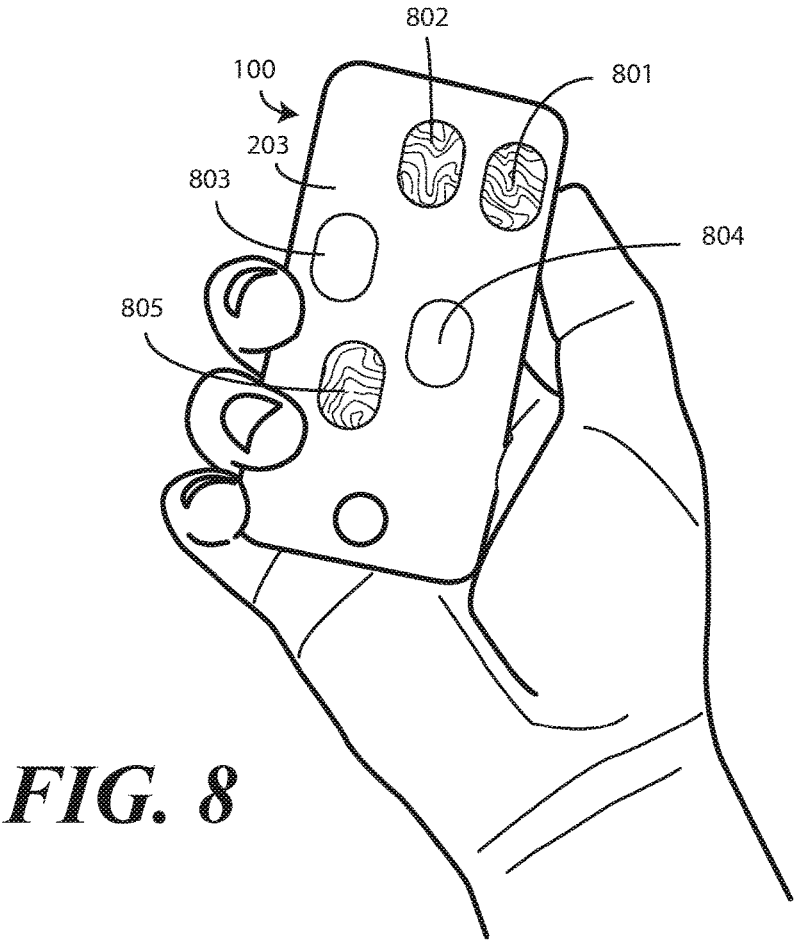
FIG. 8 illustrates one explanatory electronic device presenting examples of indicia and prompts on a display in accordance with one or more embodiments of the disclosure.

Turning now to FIG. 8, illustrated therein are various prompts that can be presented on a display 203 of an electronic device 100. The various prompts can be presented individually or in combination.

As before, the electronic device 100 can include a user interface, a biometric sensor and one or more other sensors, and one or more processors operable with the user interface, the biometric sensor, and the one or more other sensors. As described above, the one or more processors, in response to detecting a user authentication failure by the biometric sensor, can determine with the one or more other sensors that two or more persons are within a field of view of the user interface. Where the two or more persons are within the field of view of the user interface, the one or more processors can preclude entry of any user authentication code at the user interface to authenticate a person as an authorized user of the electronic device 100.

In one or more embodiments, the one or more processors further present a notification 801 at the user interface, one example of which is the display 203. In one embodiment, the notification 801 indicates that two or more persons are within the field of view of the electronic device 100.

In another embodiment, the one or more processors present a prompt 802 at the user interface when the two or more persons are within the predefined environment. In one or more embodiments, the prompt comprises a request for the electronic device 100 to be moved to a location where the only one person is within the predefined environment.

In another embodiment, the one or more processors present indicia 803 at the user interface when the two or more persons are within the predefined environment. In one or more embodiments, the indicia 803 indicate that entry of the user authentication code to authenticate the person as the authorized user of the electronic device 100 has been precluded.

In another embodiment, the one or more processors present additional indicia 804 on the user interface. In one embodiment, the additional indicia 804 indicate why the entry of the user authentication code to authenticate the person as the authorized user of the electronic device has been precluded.

In another embodiment, the one or more processors present a prompt 805 on the user interface. In one embodiment, the prompt 805 requests entry of a user input overriding preclusion of entry of the user authentication code to authenticate the person as the authorized user of the electronic device.

Figure 9:
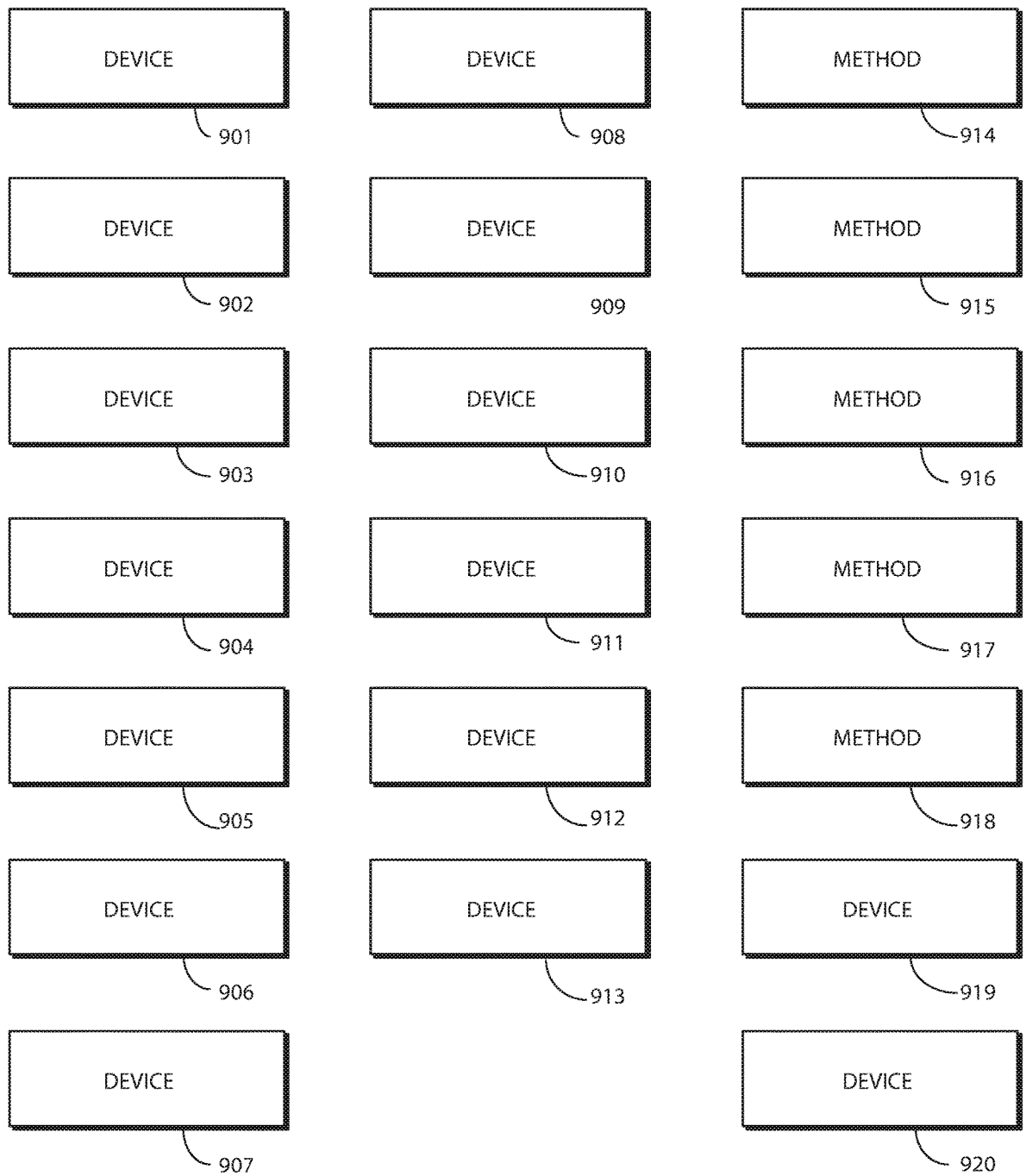
FIG. 9 illustrates one or more embodiments of the disclosure.

Turning now to FIG. 9, illustrated therein are one or more embodiments of the disclosure. At 901, an electronic device comprises a user interface. At 901, the user interface comprises a display. At 901, the electronic device comprises one or more sensors and one or more processors operable with the user interface and the one or more sensors.

At 901, the one or more processors determine, with the one or more other sensors, whether one or more persons are within a predefined environment of the electronic device. At 901, and where only one person is within the predefined environment, the one or more processors request entry of a user authentication code at the user interface to authenticate the only one person as an authorized user of the electronic device. However, at 901 where two or more persons are within the predefined environment, the one or more processors preclude entry of the user authentication code at the user interface to authenticate a person as the authorized user of the electronic device.

At 902, the one or more processors of 901 further prompt, at the user interface when the two or more persons are within the predefined environment, for the electronic device to be moved to a location where the only one person is within the predefined environment. At 903, the one or more processors of 901 further present indicia, at the user interface when the two or more persons are within the predefined environment. At 903, the indicia indicate that entry of the user authentication code to authenticate the person as the authorized user of the electronic device has been precluded.

At 904, the one or more processors of 903 further present additional indicia at the user interface when the two or more persons are within the predefined environment. At 904, the additional indicia indicate why the entry of the user authentication code to authenticate the person as the authorized user of the electronic device has been precluded.

At 905, the one or more processors of 903 further prompt, at the user interface when the two or more persons are within the predefined environment, for the entry of a user input overriding preclusion of entry of the user authentication code to authenticate the person as the authorized user of the electronic device. At 905, the one or more processors receive, from the user interface after the prompting, the user input overriding preclusion of entry of the user authentication code to authenticate the person as the authorized user of the electronic device. At 905, the one or more processors, after receiving the user input, request, at the user interface, the entry of the user authentication code to authenticate the person as the authorized user of the electronic device.

At 906, the one or more other sensors of 901 comprise an imager. At 906, the one or more processors determine whether the one or more persons are within the predefined environment of the electronic device by capturing, with the imager, one or more images of the predefined environment.

At 907, the imager of 906 defines a field of view for the one or more images. At 907, the predefined environment comprises the field of view. At 908, the field of view of 907 defines a viewing angle within which the display can be seen by at least one person of the two or more persons.

At 909, the one or more processors of 906 verify, by analyzing the one or more images, whether a distance between all but one person of the two or more persons is beyond a predefined distance threshold. At 910, the one or more processors of 909 further prompt, at the user interface when the all but one person of the two or more persons is beyond the predefined distance threshold, for entry of the user authentication code to authenticate the person as the authorized user of the electronic device.

At 911, the one or more processors of 910 further determine, by analyzing the one or more images, whether any person other than the all but one person of the two or more persons is using a lensed optical instrument. At 911, where the any person other than the all but one person of the two or more persons is using the lensed optical instrument, the one or more processors preclude the entry of the user authentication code to authenticate the person as the authorized user of the electronic device.

At 912, the one or more processors of 906 further determine, by analyzing the one or more images, whether all but one person of the two or more persons is a mirrored reflection of the all but one person. At 912, where the all but one person of the two or more persons is the mirrored reflection of the all but one person, the one or more processors request entry of the user authentication code at the user interface to authenticate the all but one person as the authorized user of the electronic device.

At 913, the one or more processors of 901 further receive, from the user interface, user input indicating that the two or more persons are within the predefined environment. At 913, in response to the user input, the one or more processors preclude entry of the user authentication code to authenticate the person as the authorized user of the electronic device.

At 914, a method in an electronic device comprises detecting, with a biometric sensor of the electronic device, a user authentication failure by the biometric sensor. At 914, the method comprises determining, with one or more other sensors of the electronic device, that two or more persons are within a predefined environment of the electronic device. At 914, the method comprises, when the two or more persons are within the predefined environment, precluding, with one or more processors, entry of a user authentication code at a user interface of the electronic device to authenticate a person as an authorized user of the electronic device.

At 915, the method of 914 further comprises prompting, with the one or more processors at the user interface, for the person to move the electronic device to a location where the person is the only person within the predefined environment. At 916, the method of 915 further comprises detecting, with one or more location detectors, both movement of the electronic device to a new location and only one person being within the predefined environment. At 916, the method thereafter comprises requesting entry of the user authentication code at the user interface to authenticate the only one person as the authorized user of the electronic device.

At 917, the method of 914 further comprises presenting a notification, with the one or more processors at the user interface, that entry of the user authentication code has been precluded. At 918, the method of 914 further comprises detecting, with the one or more other sensors, shielding of the user interface of the electronic device, and thereafter requesting entry of the user authentication code at the user interface to authenticate the person as the authorized user of the electronic device.

At 919, an electronic device comprises a user interface, a biometric sensor and one or more other sensors, and one or more processors operable with the user interface, the biometric sensor, and the one or more other sensors. At 919, the one or more processors, in response to detecting a user authentication failure by the biometric sensor, determine with the one or more other sensors that two or more persons are within a field of view of the user interface. At 919, where the two or more persons are within the field of view of the user interface, the one or more processors preclude entry of any user authentication code at the user interface to authenticate a person as an authorized user of the electronic device. At 920, the one or more processors further present a notification, at the user interface, that the two or more persons are within the field of view of the electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example the determination of whether multiple persons are within an environment may be triggered by one or more motion sensors of the electronic device. When, for instance, an electronic device is sitting on a table and in a locked state, an imager can be actuated when the electronic device is moved. When this occurs the imager can determine whether the electronic device is in a public or private setting. If the setting is public, a biometric sensor can attempt to authenticate a person as the authorized user of the electronic device.

When in the private mode, an imager or audio sensor can detect that the person is the only person in the environment, perhaps by capturing images of the electronic device being tightly coupled with the user or by a light sensor indicating shadows when the user covers the display with the hand. Where this occurs, entry of the authentication code can be enabled. Thus, when a user is attempting to unlock an electronic device in a public environment, entry of user authentication data or a user authentication code is precluded, with biometric authentication being the only option. In one or more embodiments a prompt is presented on the display indicating why authentication code entry is not available, as described above.

Advantageously, when someone, such as a friend or family member or a stranger, is detected to be looking at a display of an electronic device and is within a readable range/distance from the electronic device, a PIN entry screen is disabled. Reasons why this is occurring can be presented on the display so that the user understands what is happening. During such user authentication code preclusion states, one or more processors of the electronic device can provide other options to authenticate, e.g., a fingerprint sensor, a facial scanner, a voice recognition system, or other system.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
a user interface comprising a display;
one or more sensors; and
one or more processors operable with the user interface and the one or more sensors;
the one or more processors determining, with the one or more sensors, whether one or more persons are within a predefined environment of the electronic device; and
where only one person is within the predefined environment, requesting entry of a user authentication code at the user interface to authenticate the only one person as an authorized user of the electronic device; and
where two or more persons are within the predefined environment, precluding entry of the user authentication code at the user interface to authenticate a person as the authorized user of the electronic device; and
prompting, at the user interface when the two or more persons are within the predefined environment, for the electronic device to be moved to a location where the only one person is within the predefined environment.

2. The electronic device of claim 1, the one or more processors further determining, by analyzing one or more images, whether any person other than the person is using binoculars or a telescope, and where the any person other than the person is using the binoculars or the telescope, precluding the entry of the user authentication code to authenticate the person as the authorized user of the electronic device.

3. The electronic device of claim 1, the one or more processors further presenting indicia, at the user interface when the two or more persons are within the predefined environment, the indicia indicating that entry of the user authentication code to authenticate the person as the authorized user of the electronic device has been precluded.

4. The electronic device of claim 3, the one or more processors further presenting additional indicia, at the user interface when the two or more persons are within the predefined environment, the additional indicia indicating why the entry of the user authentication code to authenticate the person as the authorized user of the electronic device has been precluded.

5. The electronic device of claim 3, the one or more processors further:
prompting, at the user interface when the two or more persons are within the predefined environment, for the entry of a user input overriding preclusion of entry of the user authentication code to authenticate the person as the authorized user of the electronic device;
receiving, from the user interface after the prompting, the user input overriding preclusion of entry of the user authentication code to authenticate the person as the authorized user of the electronic device; and
after receiving the user input, requesting, at the user interface, the entry of the user authentication code to authenticate the person as the authorized user of the electronic device.

6. The electronic device of claim 1, the one or more sensors comprising an imager, the one or more processors determining whether the one or more persons are within the predefined environment of the electronic device by capturing, with the imager, one or more images of the predefined environment.

7. The electronic device of claim 6, the imager defining a field of view for the one or more images, wherein the predefined environment comprises the field of view.

8. The electronic device of claim 7, wherein the field of view defines a viewing angle within which the display can be seen by at least one person of the two or more persons.

9. The electronic device of claim 6, the one or more processors verifying, by analyzing the one or more images, whether a distance between all but one person of the two or more persons is beyond a predefined distance threshold.

10. The electronic device of claim 9, the one or more processors further prompting, at the user interface when the all but one person of the two or more persons is beyond the predefined distance threshold, for entry of the user authentication code to authenticate the person as the authorized user of the electronic device.

11. The electronic device of claim 10, the one or more processors further determining, by analyzing the one or more images, whether any person other than the all but one person of the two or more persons is using a lensed optical instrument, and where the any person other than the all but one person of the two or more persons is using the lensed optical instrument, precluding the entry of the user authentication code to authenticate the person as the authorized user of the electronic device.

12. The electronic device of claim 6, the one or more processors further determining, by analyzing the one or more images, whether all but one person of the two or more persons is a mirrored reflection of the all but one person, and where the all but one person of the two or more persons is the mirrored reflection of the all but one person, requesting entry of the user authentication code at the user interface to authenticate the all but one person as the authorized user of the electronic device.

13. The electronic device of claim 1, the one or more processors further receiving, from the user interface, user input indicating that the two or more persons are within the predefined environment and, in response to the user input, precluding entry of the user authentication code to authenticate the person as the authorized user of the electronic device.

14. A method in an electronic device, the method comprising:
    detecting, with a biometric sensor of the electronic device, a user authentication failure by the biometric sensor;
    determining, with one or more other sensors of the electronic device in response to the user authentication failure by the biometric sensor, that two or more persons are within a predefined environment of the electronic device;
    when the two or more persons are within the predefined environment, precluding, with one or more processors, entry of a user authentication code at a user interface of the electronic device to authenticate a person as an authorized user of the electronic device; and
    prompting, with the one or more processors at the user interface, for the person to move the electronic device to a location where the person is the only person within the predefined environment.

15. The method of claim 14, further comprising presenting, with the one or more processors at the user interface, a prompt indicating why entry of the user authentication code has been precluded.

16. The method of claim 14, further comprising detecting, with one or more location detectors, both movement of the electronic device to a new location and only one person being within the predefined environment, and thereafter requesting entry of the user authentication code at the user interface to authenticate the only person as the authorized user of the electronic device.

17. The method of claim 14, further comprising presenting a notification, with the one or more processors at the user interface, that entry of the user authentication code has been precluded.

18. The method of claim 14, further comprising detecting, with the one or more other sensors, shielding of the user interface of the electronic device, and thereafter requesting entry of the user authentication code at the user interface to authenticate the person as the authorized user of the electronic device.

19. An electronic device, comprising:
    a user interface;
    a biometric sensor and one or more other sensors; and
    one or more processors operable with the user interface, the biometric sensor, and the one or more other sensors;
    the one or more processors, in response to detecting a user authentication failure by the biometric sensor, determining with the one or more other sensors that two or more persons are within a field of view of the user interface, and where the two or more persons are within the field of view of the user interface, precluding entry of any user authentication code at the user interface to authenticate a person as an authorized user of the electronic device; and
    prompting, with the one or more processors at the user interface, for the person to move the electronic device to a location where the person is the only person within the field of view of the user interface.

20. The electronic device of claim 19, the one or more processors further presenting a notification, at the user interface, that the two or more persons are within the field of view of the electronic device.

* * * * *